United States Patent
Amemiya et al.

(10) Patent No.: US 8,064,365 B2
(45) Date of Patent: Nov. 22, 2011

(54) RELAY NODE

(75) Inventors: Kouichirou Amemiya, Kawasaki (JP); Shinya Kano, Kawasaki (JP); Yasuki Fujii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 297 days.

(21) Appl. No.: 12/559,005

(22) Filed: Sep. 14, 2009

(65) Prior Publication Data

US 2010/0002605 A1 Jan. 7, 2010

Related U.S. Application Data

(63) Continuation of application No. PCT/JP2007/055197, filed on Mar. 15, 2007.

(51) Int. Cl.
H04L 12/54 (2006.01)

(52) U.S. Cl. ........ 370/254; 370/389; 370/392; 370/401; 709/220

(58) Field of Classification Search .................. None
See application file for complete search history.

(56) References Cited

U.S. PATENT DOCUMENTS

| | | | | |
|---|---|---|---|---|
| 7,821,951 B2* | 10/2010 | Douville | ...................... | 370/248 |
| 7,990,946 B2* | 8/2011 | Deguchi | ...................... | 370/351 |
| 2002/0023152 A1 | 2/2002 | Oguchi | | |
| 2003/0103505 A1 | 6/2003 | Hidaka et al. | | |
| 2006/0083251 A1* | 4/2006 | Kataoka et al. | ............... | 370/400 |
| 2008/0304494 A1* | 12/2008 | Yokoyama | .................. | 370/400 |

FOREIGN PATENT DOCUMENTS

| | | |
|---|---|---|
| JP | 08-097860 | 4/1996 |
| JP | 2000-244563 | 9/2000 |
| JP | 2001-292163 | 10/2001 |
| JP | 2003-169097 | 6/2003 |
| JP | 2005-159912 | 6/2005 |

OTHER PUBLICATIONS

International Preliminary Report on Patentability and Written Opinion of the International Searching Authority dated Sep. 29, 2009, from the corresponding International Application.
A. Farrel, et. al., "inter domain MPLS and GMPLS Traffic Engineering—RSVP—TE extensions", [on line] Jan. 2007, Internet-Draft, [retrieval date Jun. 6, 2007], Internet <URL: http://www.watersprings.org/pub/id/draft-ietf-ccamp-inter-domain-rsvp-te-04.txt>.
D. Awduche, et. al., "RSVP-TE: Extensions to RSVP for LSP Tunnels", Network Working Group Request for Comments (RFC) 3209, Dec. 2001.

(Continued)

Primary Examiner — Hassan Phillips
Assistant Examiner — Duc Duong
(74) Attorney, Agent, or Firm — Katten Muchin Rosenman LLP

(57) ABSTRACT

A relay node comprising a reception station for receiving a route trace control message including routing information on a path used for data transfer from a starting node to a terminal node from the preceding node on the path, an editing section for, if the home node is boundary node located at the boundary of a routing information shielding section on the path, editing so that a portion on the routing information shielding section of the routing information included in the route trace control message received by the reception section cannot be identified, and a transmission section for sending out a route trace control message after the edition to the node of the subsequent stage, which is located on the path.

6 Claims, 26 Drawing Sheets

OTHER PUBLICATIONS

L. Berger, "Generalized Multi-Protocol Label Switching (GMPLS) Signaling Functional Description", Network Working Group Request for Comments (RFC) 3471, Jan. 2003.

L. Berger, "Generalized Multi-Protocol Label Switching (GMPLS) Signaling Resource ReserVation Protocol-Traffic Engineering (RSVP-TE) Extensions", Network Working Group Request for Comments (RFC) 3473, Jan. 2003.

K. Kompella, "Signalling Unnumbered Links in Resources ReSerVation Protocol—Traffic Engineering (RSVP-TE)", Network Working Group Request for Comments (RFC) 3477, Jan. 2003.

J. Moy, "OSPF Version 2", Network Working Group Request for Comments (RFC) 2328, Apr. 1998.

D. Katz, et. al., "Traffic Engineering (TE) Extensions to OSPF Version 2", Network Working Group Request for Comments (RFC) 3630, Sep. 2003.

K. Kompella, et. al., Routing Extensions in Support of Generalized Multi-Protocol Label Switching (GMPLS), Network Working Group Request for Comments (RFC) 4202, Oct. 2005.

K. Kompella, et. al., "OSPF Extensions in Support of Generalized Multi-Protocol Label Switching (GMPLS)", Network Working Group Request for Comments (RFC) 4203, Oct. 2005.

International Search Report dated Jun. 19, 2007 for the corresponding International Application No. PCT/JP2007/055197.

* cited by examiner

FIG. 3

| INTERFACE | DESTINATION DOMAIN | SELF-DOMAIN |
|---|---|---|
| 1 | DOMAIN 2 | DOMAIN 2 |
| 2 | DOMAIN 3 | |

FIG. 11

| INTERFACE | DESTINATION DOMAIN | WITHIN/OUTSIDE SHIELDING TARGET AREA | SELF-DOMAIN |
|---|---|---|---|
| 1 | 1 | OUTSIDE | 1 |
| 2 | 1 | WITHIN | |
| 3 | 1 | WITHIN | |
| 4 | 2 | WITHIN | |
| 5 | 2 | WITHIN | |

RELAY NODE

CROSS-REFERENCE TO RELATED APPLICATIONS

This is a continuation of Application PCT/JP2007/055197, filed on Mar. 15, 2007, now pending, the contents of which are herein wholly incorporated by reference.

FIELD

The present invention relates to a technology of acquiring route trace information in a GMPLS (Generalized Multi-Protocol Label Switching)/MPLS (Multi-Protocol Label Switching) network.

BACKGROUND

At first, the GMPLS/MPLS network and a path establishing signaling protocol used in the GMPLS/MPLS will briefly be explained. Then, thereafter, a conventional route tracing method will be described.

(GMPLS/MPLS)

The GMPLS/MPLS is a technology of forwarding data according to label information. The label information is defined such as a fixed length label attached to the head of a packet, a timeslot of time division transmission and a light wavelength in optical multiplexing transmission. Particularly, a network for forwarding the packet by use of the fixed length label attached to the head of the packet is called an MPLS network. Note that the GMPLS network involves using any one piece or some pieces of label information including the fixed length label employed in the MPLS network.

For example, in the packet transfer using the fixed length label, a relay node (LSR: Label Switched Router) retains a label table having a relationship between a tuple of input label/input IF (Interface) and a tuple of output label/output IF (Interface). Then, when relaying the packet, the output IF is determined based not on an address but on the label attached to the received packet, the label attached to the packet is rewritten into the output label, and the packet is thus relayed. This process being repeated, the packet is transmitted to the destination. Note that a relay node at an ingress (ingress node) of the GMPLS/MPLS network attaches the label for the first time. This is the fast packet relay technology.

FIG. 21 is an explanatory diagram of a packet relay method. Herein, the packet is forwarded to an LSR 4 from an LSR 1. To begin with, the LSR 1 attaches a label a to the packet to be forwarded. Then, the LSR 2, when receiving the packet attached with the label a via an interface IF#1, acquires the output IF and the output label by searching the label table. Subsequently, after rewriting the label of the packet into the output label, the packet is output to the output IF. This process being repeated, the packet is forwarded to an egress LSR 4 (egress node). Thus, the packet is forwarded according to the fixed length label, thereby enabling the packet relay to be speeded up.

Moreover, in the relay node, bandwidth guarantee for each packet flow can be implemented by associating each label with bandwidth control in the relay node.

In the time division transmission, each node retains a label table having a relationship between a tuple of input timeslot/input IF (Interface) and a tuple of output timeslot/output IF. Then, each node determines, based on a reception IF and a reception timeslot, the output IF and the output timeslot, and outputs the data to the output timeslot of the output IF. This process being repeated, the data is transmitted to the destination.

In the optical multiplexing transmission, each node retains a label table having a relationship between a tuple of input light wavelength/input IF (Interface) and a tuple of output light wavelength/output IF. Then, each node determines, based on the reception IF and the reception light wavelength, the output IF and the output light wavelength, then converts the reception light wavelength into the output light wavelength, and outputs the data to the output IF. This process being repeated, the data is transmitted to the destination.

The GMPLS is a technology of performing the transfer with the same mechanism in a way that deals with each of the fixed length label, the timeslot and the light wavelength as the label.

(Path Establishing Signaling Protocol (RSVP-TE: Resource reSerVation Protocol-Traffic Extension))

FIG. 22 is a diagram illustrating an operation of the path establishing signaling protocol.

In the GMPLS/MPLS, each node is required to organize the label table. Therefore, the path establishing signaling protocol (CR-LDP (Constraint-based Routing Label Distribution Protocol)/RSVP-TE) as in FIG. 22 is employed.

Hereinafter, the path establishing operation with the aid of organizing the label table will be described by exemplifying the RSVP-TE. The ingress node making the path establishing request transmits a path establishing request message (Path message) to the egress node of the path in a hop-by-hop (node-to-node) mode. In the example of FIG. 22, the information about the relay hop-to-hop nodes is inserted into the Path message in order to explicitly designate a route. The egress node receiving the Path message sends a path establishing response message (Resv message) for allocating the label back to the ingress node along the route on which the Path message has been transmitted. At this time, the label stored in the Resv message is registered in the label table, thereby organizing the label table for forwarding the data. A path ID is stored in both of the Path message and the Resv message and is registered together in the label table.

(Conventional Route Trace Information Acquiring Method RRO)

FIG. 23 I a diagram illustrating an operation of a route tracing function which uses RRO (Record Route Object).

The following discussion will deal with a conventional technique for actualizing the route tracing function by exemplifying the RSVP-TE. The IETF Standards (Non-Patent document 1, Non-Patent document 4) define a technique using the RRO as a technique of actualizing the route trace in the RSVP.

The operation thereof will hereinafter be described (FIG. 23). The ingress node making the route trace request inserts an object RRO for making the route trace request into the path establishing request (Path)/response (Resv) message, and, after adding a self-node identifier as a RRO sub-object, transmits the path establishing message (Path message) in the hop-by-hop mode. An intermediate node receiving the Path message determines, the RRO sub-object being inserted therein, that the route tracing function is set effective, and, after adding the self-node identifier as the RRO sub-object to the list, forwards the Path message to a next hop (next node). The respective intermediate nodes execute regular procedures, whereby the RRO containing the list of the nodes via which the Path message is sent is carried through the Path message down to the egress node eventually. The egress node receiving the Path message inserts the RRO object and the sub-object containing the self-node identifier into the response (Resv) message, and sends this message back to the ingress node along the route on which the Path message has been sent. The intermediate node receiving the Resv message containing the RRO sub-object, after adding the self-node identifier as the RRO sub-object to the list, forwards the Resv message to the next hop (next node). The RRO containing the list of the nodes via which the Resv message has been sent is carried up to the ingress node through the Resv message. Each node can acquire the list of the node group located on an uplink of the self-node from the Path message and the list of the node group locates on a downlink of the self-node from the Resv message and can acquire the information about the nodes via which the established path extends from these two items of information by performing the procedures described above.

FIG. 24 is a flowchart illustrating the standard specification processing flow described above. Each relay node, upon receiving the path establishing request (or the response), checks whether this message contains the route record request (RRO) or not. The relay node, if the route record request is contained, adds the self-node identifier to the route information list and transmits the path establishing request (or the response) to the next node. If the route record request is not contained, the relay node transmits the path establishing request (or the response) as it is to the next node.

[Patent document 1] Japanese Patent Laid-Open Publication No. 2000-244563.

[Non-Patent document 1] D. Awduche, L. Berger, D. Gan, T. Li, V. Srinivasan, G. Swallow, "RSVP-TE: Extensions to RSVP for LSP Tunnels." Network Working Group Request for Comments (RFC) 3209, December 2001.

[Non-Patent document 2] L. Berger, Ed., "Generalized Multi-Protocol Label Switching (GMPLS) Signaling Functional Description." Network Working Group Request for Comments (RFC) 3471, January 2003.

[Non-Patent document 3] L. Berger, Ed., "Generalized Multi-Protocol Label Switching (GMPLS) Signaling Resource ReserVation Protocol-Traffic Engineering (RSVP-TE) Extensions." Network Working Group Request for Comments (RFC) 3473, January 2003.

[Non-Patent document 4] K. Kompella, Y. Rekhter, "Signaling Unnumbered Links in Resource ReSerVation Protocol-Traffic Engineering (RSVP-TE)." Network Working Group Request for Comments (RFC) 3477, January 2003.

[Non-Patent document 5] J. Moy, "OSPF Version 2." Network Working Group Request for Comments (RFC) 2328, April 1998.

[Non-Patent document 6] D. Katz, K. Kompella, D. Yeung, "Traffic Engineering (TE) Extensions to OSPF Version 2." Network Working Group Request for Comments (RFC) 3630, September 2003.

[Non-Patent document 7] K. Kompella, Ed., Y. Rekhter, Ed., "Routing Extensions in Support of Generalized Multi-Protocol Label Switching (GMPLS)." Network Working Group Request for Comments (RFC) 4202, October 2005.

[Non-Patent document 8] K. Kompella, Ed., Y. Rekhter, Ed., "OSPF Extensions in Support of Generalized Multi-Protocol Label Switching (GMPLS)." Network Working Group Request for Comments (RFC) 4203, October 2005.

SUMMARY

FIG. 25 is a diagram illustrating a problem of the existing route trace.

In the network where a plurality of network domains is connected, if each domain is provided on a per-carrier basis, it is required that intra-domain information be concealed, and such a mechanism is adopted as not to disclose the information within the carrier network to the greatest possible degree in order to avoid DOS (Denial of Service) attack also in the Internet.

On the other hand, in the GMPLS/MPLS network, in the case of the RRO for acquiring the route trace information, it is specified as a rule that each node forwards the data to a neighboring node in a way that registers the self-node ID in the RRO sub-object. This mechanism has the following problems if it is not desired that the information within a certain network range (domain) is disclosed to the outside, and as a result it follows that the intra-domain information can be easily extracted from an external domain (FIG. 25).

(1) A border with a network to which the information must not be disclosed can not be known.

(2) Concealing target information can not be specified from within the route information described in the route trace information.

(3) The route information described in the route trace information can not be deleted.

FIG. 26 is a diagram illustrating an operation when the RRO function is ineffective. When a node A transmits the Path message containing the RRO, a node D defined as an RRO non-implemented node sends an error purporting that the node D does not support the RRO back to the node A. The node A transmits a Path message containing none of the RRO and establishes the path.

Thus, if it is not desired to disclose the information, the information can be prevented from being leaked outside the domain if the intra-domain node is configured so as not to support the RRO (FIG. 26). The route trace information acquiring function itself becomes ineffective, and hence, in the case of desiring to acquire the intra-domain route trace information, it is required that a technique different from the existing mechanism be taken.

According to an aspect of the embodiment, a relay node includes:

a receiving unit receiving a control message for a route trace, which contains route information about a path extending from an ingress node to an egress node and used for forwarding data, from an anterior node on the path;

an editing unit, if a self-node is a border node located at a border of a route information shielding zone on the path, editing, in an undistinguishable status, information about the route information shielding zone of route information contained in the route trace control message received by the receiving unit; and a transmitting unit transmitting the route trace control message after being edited to a posterior node on the path.

Preferably, in the relay node, the editing unit adds, to the route information, pseudo information about the route information shielding zone as a substitute for the deleted information about the route information shielding zone.

Preferably, in the relay node, the route information includes a list containing an identifier of a node through which the path extends and a flag indicating whether the node belongs to the route information shielding zone or not, and the editing unit specifies, based on the flag, the node belonging to the route information shielding zone in the list, and deletes the identifier of the specified node from the list.

Preferably, the relay node further includes a link management information database stored with a domain to which the self-node belongs and a domain to which another relay node connecting with a self-device belongs, wherein the editing unit refers to the link management information database and thus determines whether or not the domain to which the self-device belongs is coincident with the domain to which a second relay node defined as a transmitting destination of the control message belongs, and determines that the self-node is the border node if the domain to which the self-device belongs is not coincident with the domain to which the posterior relay node device defined as the transmitting destination of the control message belongs.

Preferably, in the relay node, the editing unit, if the self-node is not the border node but belongs to the route information shielding zone, attaches the identifier of the self-node and a flag indicating that the self-node belongs to the route information shielding zone to the route trace control message received by the receiving unit.

Herein, the editing unit includes a RRO processing unit. Further, the storage unit includes a shielding target node database.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a diagram illustrating a link management information database of a node 10F (domain 2, within a shielding area).

FIG. 11 is a diagram illustrating the link management information database of anode 20C (domain 1, within the shielding area).

DESCRIPTION OF EMBODIMENTS

Embodiments will hereinafter be described with reference to the drawings. Configurations in the embodiments are exemplifications, and the present invention is not limited to the configurations in the embodiments. Further, the embodiments can be configured in proper combinations.

First Embodiment

Architecture

Figure 1:
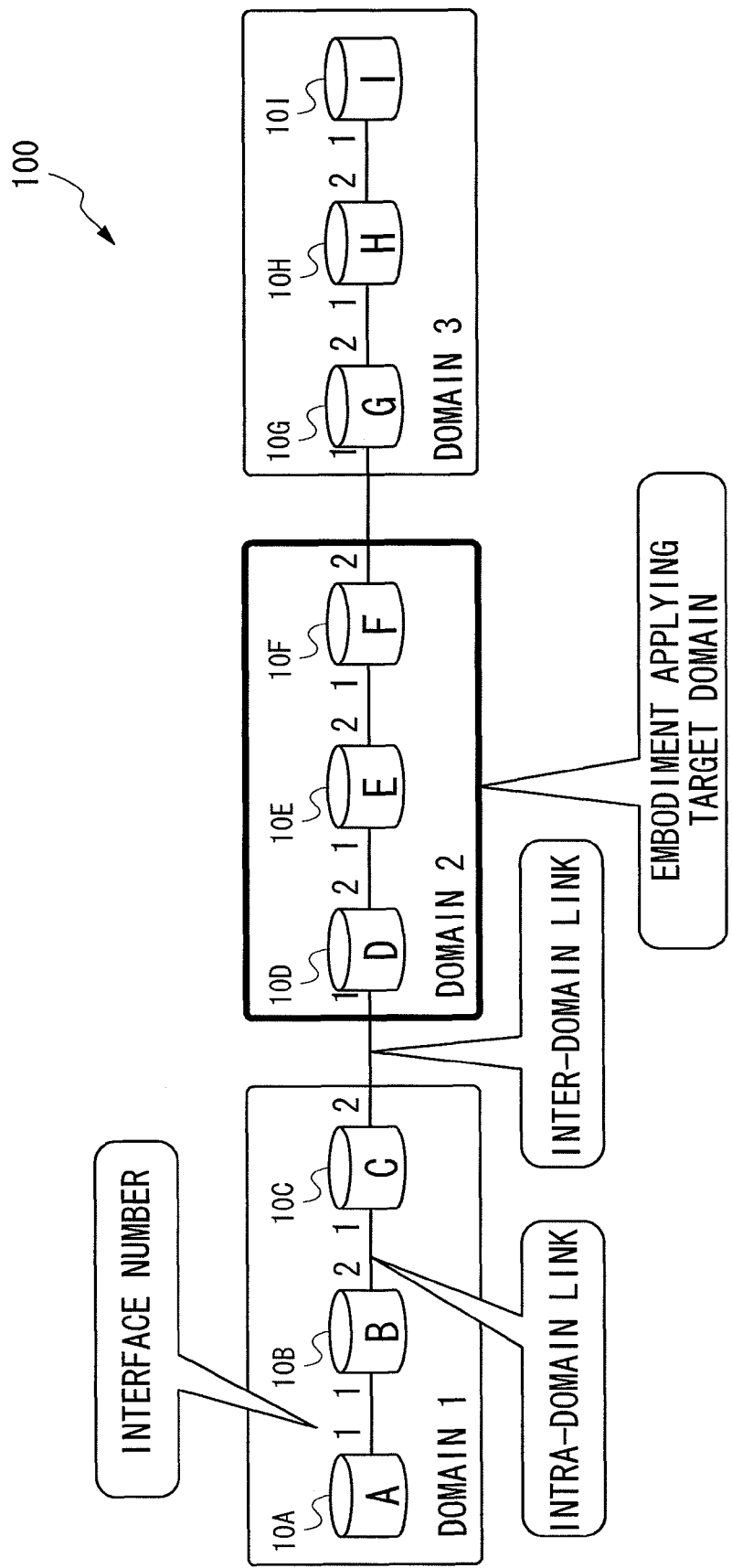
FIG. 1 is a diagram illustrating how a shielding area based on a domain is designated in a first embodiment.

FIG. 1 is a diagram illustrating an example of a network architecture in the first embodiment. FIG. 1 illustrates an example in the case of setting a shielding target area of route information on a domain basis.

A domain can be also re-segmented corresponding to a shielding target area, in which an arbitrary range is set as the shielding target area irrespective of the domain.

Nine pieces of nodes (nodes 10A through 10I) exist in a network 100 in FIG. 1. A domain 1 embraces the nodes 10A, 10B and 10C, a domain 2 embraces the nodes 10D, 10E and 10G, and a domain 3 embraces the nodes 10G, 10H and 10I. Herein, the domain 2 is set as the shielding target area of the route information. In this case, the node located at a border of the shielding target area recognizes that a self-node is a shielding border node by use of domain attribute information (a link management information database) of the link. Herein, a link within the domain is defined as an intra-domain link, and a link establishing a connection between the domains is defined an inter-domain link. Each node manages the link (link attribute) connecting directly with the self-node.

Figure 2:
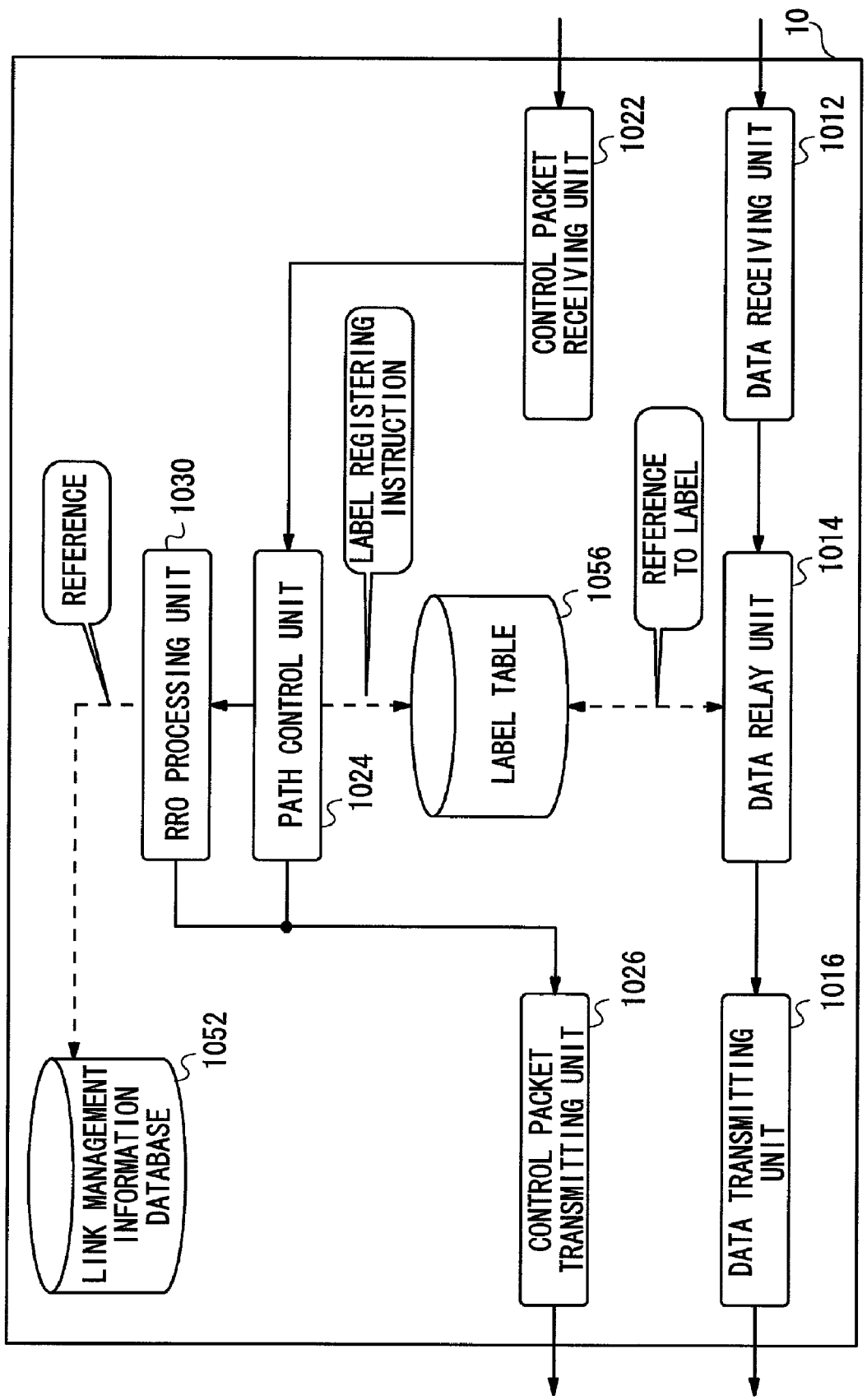
FIG. 2 is a diagram illustrating a configuration of a node in the first embodiment.

FIG. 2 is a diagram illustrating a configuration of the node in the shielding target area of the route information in the first embodiment. The node in the shielding target area of the route information in the first embodiment includes a data receiving unit 1012, a data relay unit 1014, a data transmitting unit 1016, a control packet receiving unit 1022, a path control unit 1024, a control packet transmitting unit 1026, a RRO processing unit 1030, a link management information database 1052, and a label table 1056.

The data receiving unit 1012 receives the data from a neighboring node and transmits the data to the data relay unit 1014 in order to determine a destination thereof.

The data relay unit 1014 receives the data from the data receiving unit 1012. The data relay unit 1014 refers to the label table 1056 and thus determines the destination of the data received from the data receiving unit 1012. The data relay unit 1014 attaches a label described in the label table 1056 (to the data) and transmits the data (attached with the label) to the data transmitting unit 1016.

The data transmitting unit 1016 receives the data from the data relay unit 1014. The data transmitting unit 1016 transmits the data attached with the label to the neighboring node.

The control packet receiving unit 1022 receives, from the neighboring node, a control packet for establishing and canceling a path. The control packet receiving unit 1022 transmits the control packet to the path control unit 1024.

The path control unit 1024 receives the control packet from the control packet receiving unit 1022. The path control unit 1024 implements label allocation for establishing the path in response to a request of the control packet. The path control unit 1024 registers the allocated-label information in the label table 1056. The path control unit 1024 rewrites contents (items of data) of the control packet into those for transmission to a next neighboring node as the necessity may arise. The path control unit 1024 transmits the control packet to the control packet transmitting unit 1026. Further, the path control unit 1024, if the control packet contains a RRO request, transmits the control packet to the RRO processing unit 1030. This is because the RRO processing unit 1030 executes a control packet process.

The RRO processing unit 1030 receives the control packet containing the RRO request from the path control unit 1024. The RRO processing unit 1030 executes a Record Route Object (RRO) entry adding process. To be specific, the RRO processing unit 1030 adds RRO sub-object containing an identifier of the self-node to the RRO. Moreover, the RRO processing unit 1030 adds, to the RRO, a shielding target flag representing that the RRO sub-object is the shielding target node. Further, the RRO processing unit 1030 executes processes such as a shielding border node determining process, a shielding target route information specifying process and a shielding target route information deleting process. The RRO processing unit 1030 gets a processing result contained in the control packet and thus transmits the control packet to the control packet transmitting unit 1026.

The control packet transmitting unit 1026 receives the control packet from the path control unit 1024 of the RRO processing unit 1030, and transmits the control packet to the neighboring node.

The link management information database 1052 is stored with information on an associated destination domain on a per-interface basis of the self-node. Further, the link management information database 1052 is stored with information on the domain (self-domain) to which the self-node belongs. The destination domain of a specified interface is compared with the domain to which the self-node belongs, thereby making it possible to determine whether a connecting destination node of the link of the specified interface exists within the domain or outside the domain.

FIG. 3 is a diagram illustrating an example of the link management information database of the node 10F. Each node has the link management information database 1052. The link management information database 1052 retains the information on the domain (self-domain) to which the self-node belongs and the information about the destination domain on the per-interface basis. In the node 10F, the node 10F itself belongs to the domain 2, the domain 2 is connected to an interface #1, and the domain 3 is connected to an interface #2. It is decided from this topology that the interface #1 of the node 10F is defined as the intra-domain link, while the interface #2 of the node 10F is defined as the inter-domain link.

Operational Example

Figure 4:
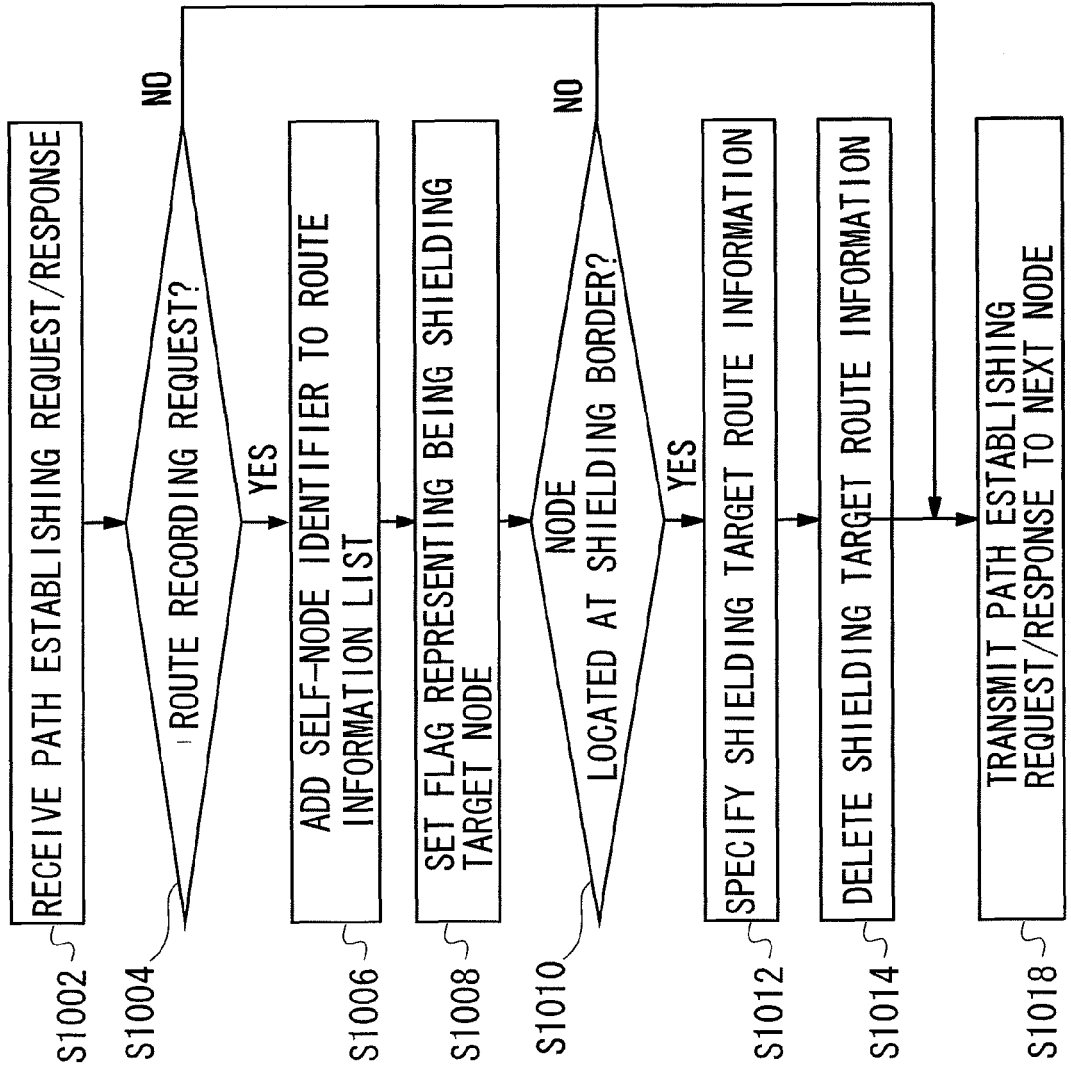
FIG. 4 is a flowchart illustrating a processing flow in the first embodiment.

FIG. 4 is a flowchart illustrating an example of a processing flow of the node within the shielding target area in the first embodiment. Herein, the discussion will be focused on an example of the node 10F. The nodes 10D and 10E also execute the processes according to the same processing flow.

Herein, a path of a route extending from the node A to the node I sequentially via the node 10B, the node 10C, the node 10D, the node 10E, the node 10F, the node 10G and the node 10H, is established based on a path establishing signaling protocol (RSVP-TE). The ingress node 10A makes a route trace request by issuing a Path message containing the RRO by way of a path establishing request.

The node 10F receives the path establishing request from the neighboring node (FIG. 4: S1002). The node 10F checks whether or not the path establishing request is the Path message containing the RRO (S1004). If the path establishing request is the Path message which does not contain the RRO (S1004; NO), after a predetermined process, this path establishing request is transmitted to the next node (S1018). If the path establishing request is the Path message containing the RRO (S1004; YES), a normal path establishing process is executed, and simultaneously the RRO sub-object containing the identifier of the self-node is added to the route information list (S1006, RRO process). The node 10F adds a flag representing that the RRO sub-object is the shielding target (S1008).

Figure 5:
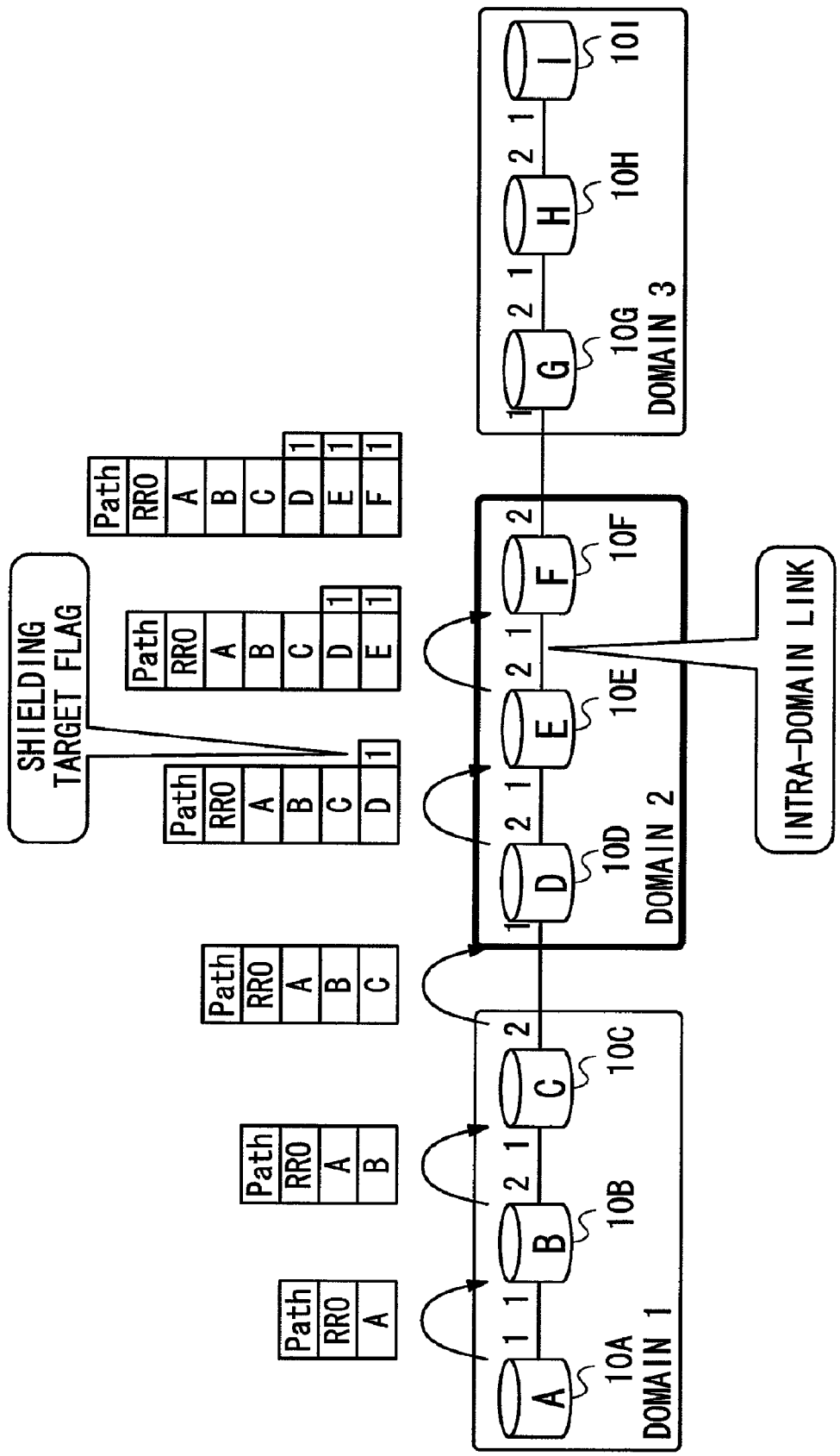
FIG. 5 is a diagram illustrating how a shielding target flag is attached.

FIG. 5 is a diagram illustrating an example of how the shielding target flag is attached. In the node 10D, the node 10E and the node 10F, the shielding target flag (1) representing that the RRO sub-object is the shielding target is attached together with the RRO sub-object containing the identifier (D, E, or F) of the self-node.

Next, the node 10F specifies the interface from which the Path message should be sent. Information for specifying this interface can be acquired in such a way that the node 10F itself implements a routing algorithm by use of information on an egress (terminal point) of the path. Moreover, if the Path message contains Explicit Route Object that designates the route, the information is acquired based on a description of the Explicit Route Object.

The node 10F determines whether or not the self-node is located at the shielding border (FIG. 4: S1010, a shielding border node determining process). The node 10F compares the information of the self-domain in the link management information database 1052 with the information of the destination domain of the interface from which the Path message is transmitted, thereby deciding whether the self-node is located at the shielding border or not.

Herein, in the case of the node 10D (or the node 10E), the information of the self-domain is coincident with the information of the destination domain (FIG. 4: S1010; NO). At this time, the node 10D (or the node 10E) decides that the self-node is not located at the shielding border and, after the predetermined process, transmits the path establishing request to the next node (S1018).

In the case of the node 10F, the information of the self-domain is not coincident with the information of the destination domain (FIG. 4: S1010; YES). At this time, the node 10F decides that the self-node is located at the shielding border, and executes the next process. The node 10F refers to the flag representing that the RRO sub-object is the shielding target, and thus specifies the shielding target route information (the information on the node defined as the shielding target) (S1012, a shielding target route information specifying process). The RRO sub-object, to which the flag representing that the RRO sub-object is the shielding target is attached, is determined to be the shielding target route information. The node 10F deletes the RRO sub-object determined to be the shielding route information from the list (S1014, a shielding target route information deleting process). The node 10 transmits, after the predetermined process, the path establishing request to the next node (S1018).

It is an available scheme that the node 10F determines, before attaching the shielding target flag, whether the self-node is the shielding border node or not, and, when determining that the self-node is the shielding border node, executes neither the process of adding the RRO sub-object containing the identifier of the self-node nor the process of attaching the shielding target flag.

Figure 6:
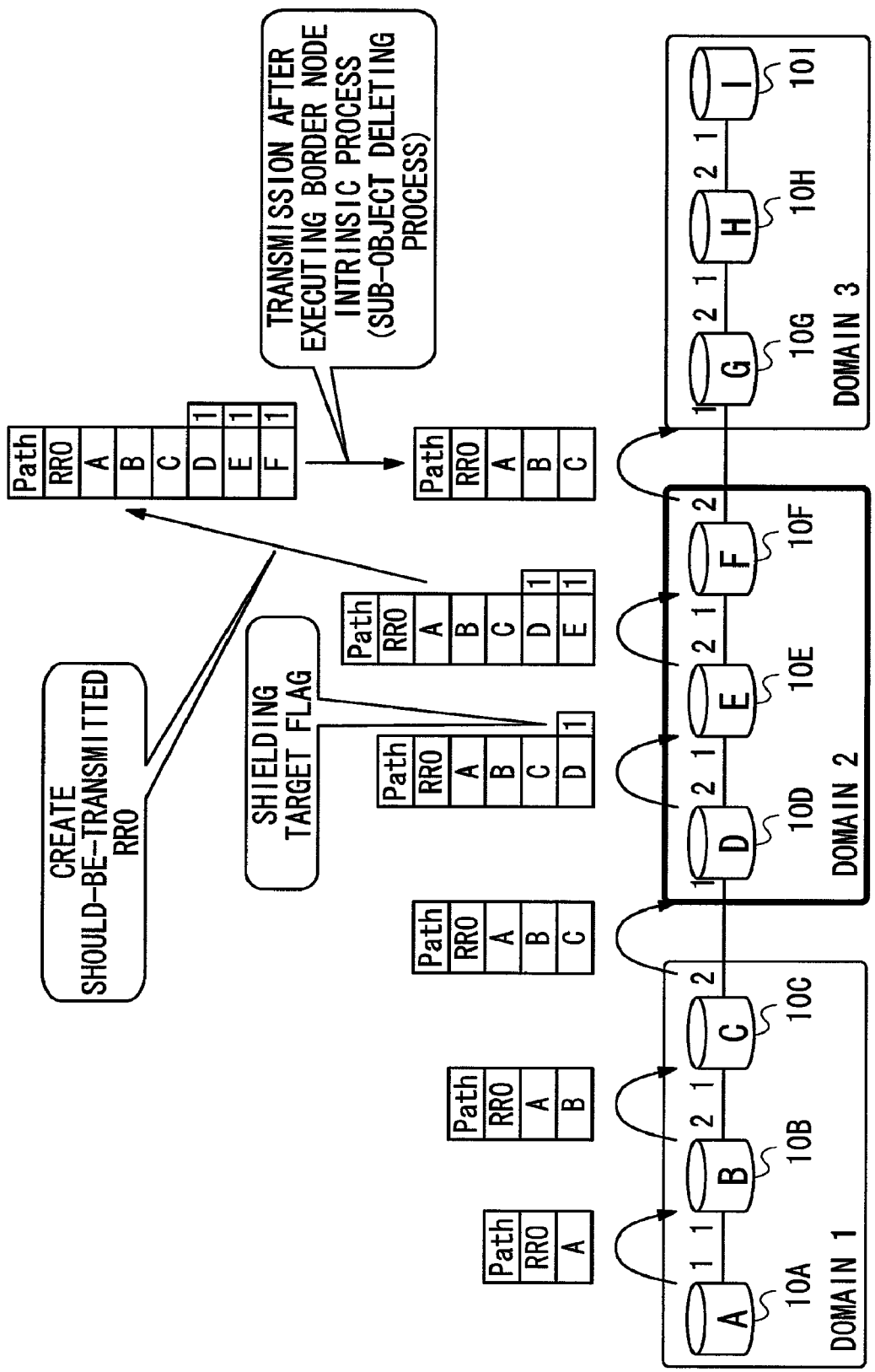
FIG. 6 is a diagram illustrating a sub-object deleting process by a border node.

FIG. 6 is a diagram illustrating an example of an RRO sub-object deleting process by the border node. The node 10F, when deciding that the self-node is the shielding border node, deletes the RRO sub-object (D, E, F) to which the flag representing that the RRO sub-object is the shielding target and this flag.

Figure 7:
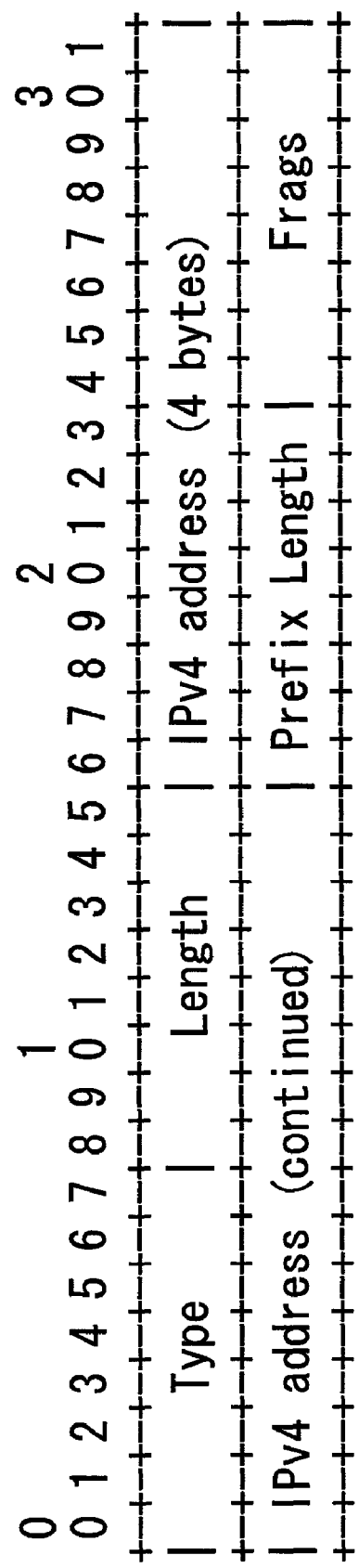
FIG. 7 is a diagram illustrating RRO IPv4 address sub-object (Type 0x01).
Figure 8:
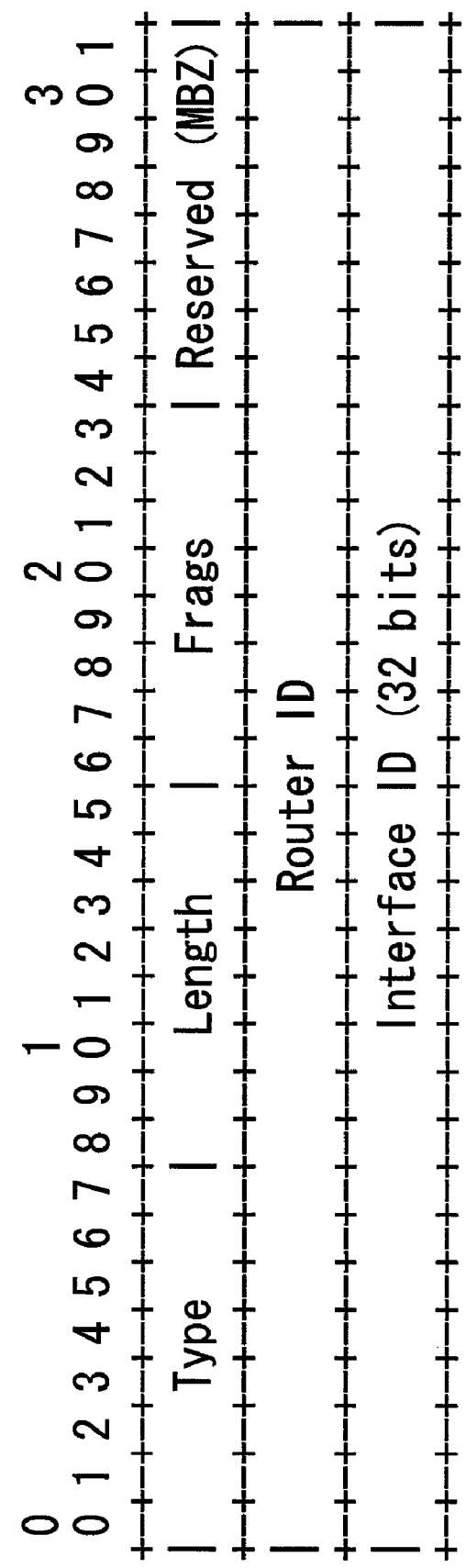
FIG. 8 is a diagram illustrating RRO Unnumbered Interface ID sub-object (Type 0x04).

FIGS. 7 and 8 are diagrams each illustrating sub-object defined by standard. FIG. 7 depicts Type 0x01 IPv4 address sub-object, and FIG. 8 depicts Type 0x04 Unnumbered Interface ID sub-object.

In the case of using Type 0x01 IPv4 address sub-object in FIG. 7, the node identifier is added to IPv4 address. In the case of employing Type 0x04 Unnumbered Interface ID sub-object in FIG. 8, the node identifier is added to Router ID, and the interface number of the interface receiving the Path message containing the RRO or the interface number of the interface transmitting the Path message containing the RRO, is added to Interface ID. The shielding target flags can be realized by defining new values in Flags. The already-defined flags are given below.

0x01 Local protection available
0x02 Local protection in use

In the case of using Type 0x04 Unnumbered Interface ID sub-object in FIG. 8, the shielding target flag may also be realized by defining a new flag in a "Reserved" field.

Figure 9:
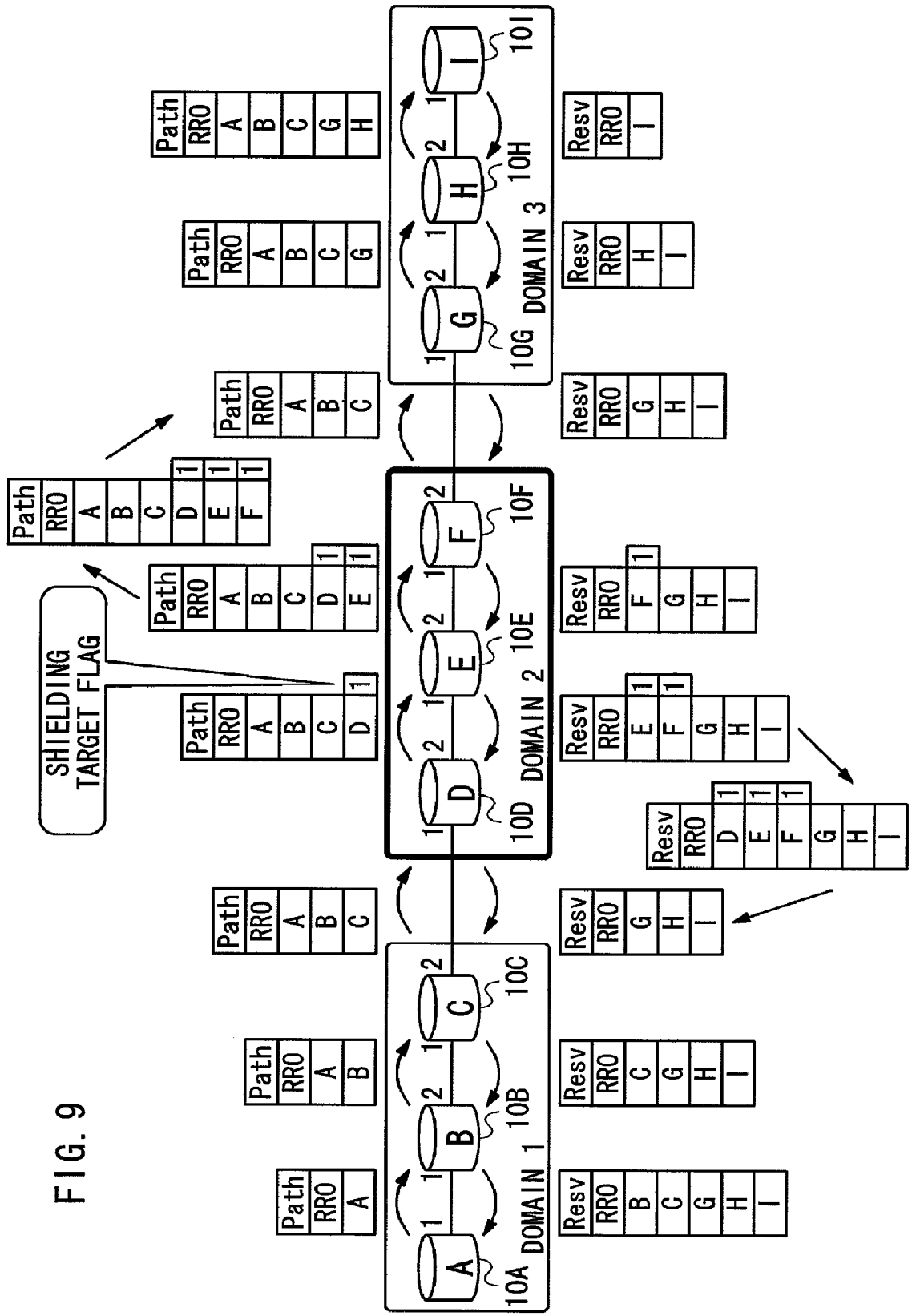
FIG. 9 is a diagram illustrating a process through a Resv message.

FIG. 9 is a diagram illustrating an example of a case of using a Resv message of a path establishing response. It is assumed that the domain 2 embracing the node 10D, the node 10E and the node 10F is the shielding target area.

The node 10F receiving the Resv message containing the RRO by way of the path establishing response from the node 10G executes the normal path establishing process and the RRO process as well. The node 10F adds the RRO sub-object containing the identifier of the self-node to the RRO, and attaches the shielding target flag representing that the RRO sub-object is the shielding target. Next, the node 10F specifies the interface from which the Resv message should be sent. This information is obtained by referring to Path State generated within the node on the occasion of receiving and transmitting the Path message. After obtaining the message-should-be-sent interface (which is herein #1), the node 10F makes collation with the link attribute information (the link management information database 1052) managed by the self-node, and thus determines whether the interface is the intra-domain link or the inter-domain link. In the case of the node 10F, the interface #1 from which the Resv message should be sent next is the intra-domain link, and hence the determination is that the self-node is not the shielding border node. The node 10F other than the shielding border node executes the process of sending the Resv message. The same process is carried out also by the node 10E.

The node 10D receiving the Resv message containing the RRO by way of the path establishing response from the node 10E executes the normal path establishing process and the RRO process as well. The node 10D adds the RRO sub-object containing the identifier of the self-node to the RRO, and attaches the shielding target flag representing that the RRO sub-object is the shielding target. The node 10D determines whether the self-node is the shielding border node or not. The node 10D, as the interface #1 from which the Resv message should be sent next is the inter-domain link, determines that the self-node is the shielding border node. The node 10D serving as the shielding border node refers to the RRO sub-object list and deletes the RRO sub-object attached with the shielding target flag from the list. Thereafter, the node 10D registers the RRO in the Resv message and sends this message to the interface #1.

Operation and Effect in First Embodiment

According to the first embodiment discussed above, the normal route information can be acquired within the shielding target area without disclosing the route information of the shielding target area to the respective nodes outside the shielding target area. For example, the node 10G outside the shielding target area acquires uplink route information {A, B, C} from the Path message and downlink route information {H, I} from the Resv message. Route information {A, B, C, G, H, I} of the path is obtained from a combination of these items of information and the information of the self-node. This is a format to conceal route information {D, E, F} within the shielding target area. On the other hand, the node 10E within the shielding target area acquires the uplink route information {A, B, C, D} from the Path message and the downlink route information {F, G, H, I} from the Resv message. The route information {A, B, C, D, E, F, G, H, I} of the path is obtained from the combination of these items of information and the information of the self-node. This is the route information including all of the nodes on the path.

Modified Example

Figure 10:
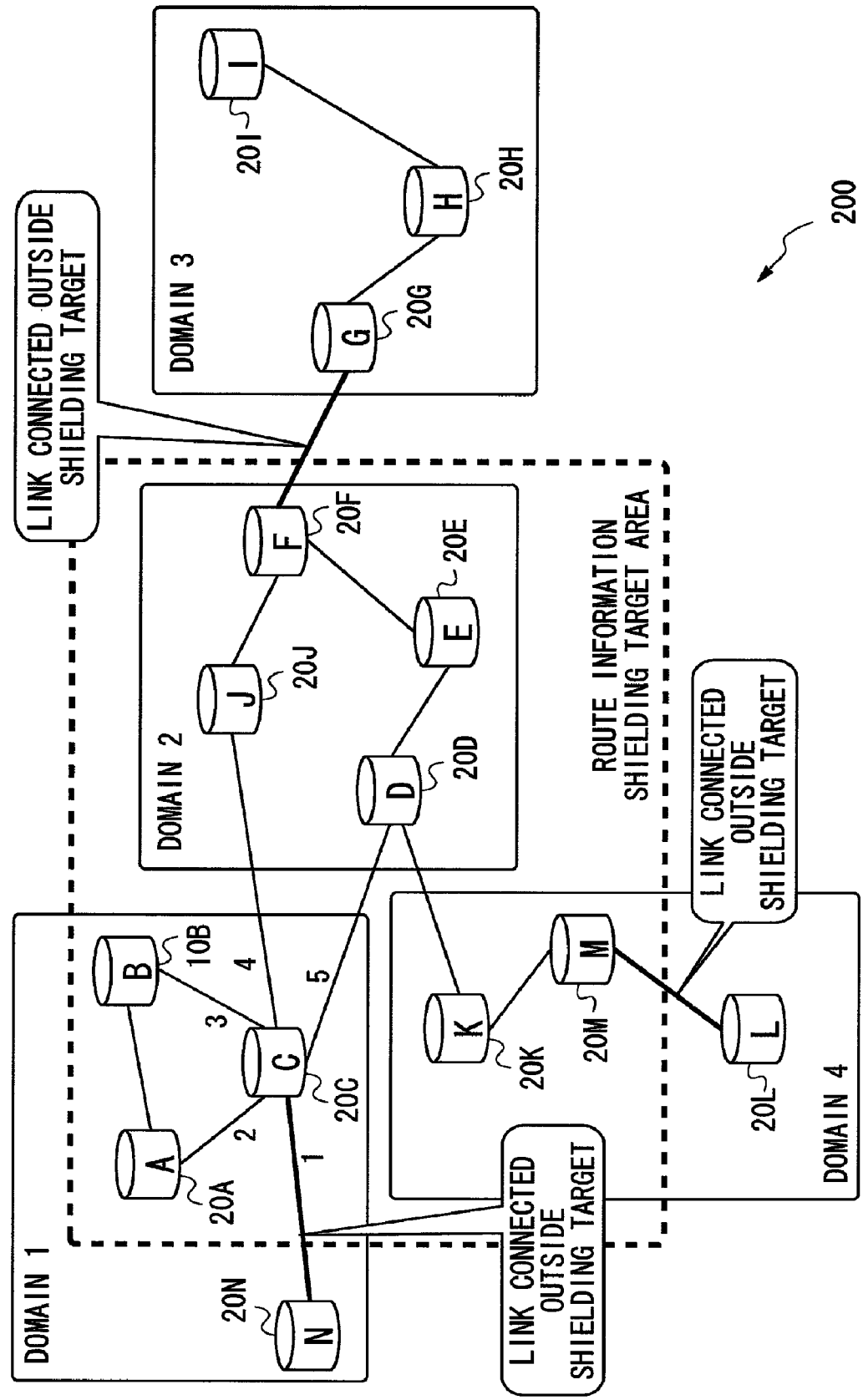
FIG. 10 is a diagram illustrating how an arbitrary shielding range is designated.

FIG. 10 is a diagram illustrating an example of the network architecture in a modified example of the first embodiment. FIG. 10 depicts the example in which the shielding target area of the route information is arbitrarily set irrespective of the domain.

Thirteen pieces of nodes (Nodes 20A-20M) exist in a network 200 in FIG. 10. The domain 1 embraces the nodes 20A, 20B, 20C and 20N, the domain 2 embraces the nodes 20D, 20e, 20F and 20J, the domain 3 embraces the nodes 20G, 20H and 20I, and the domain 4 embraces the nodes 20K, 20L and 20M.

Herein, an area circumscribed with a dotted line in FIG. 10 is defined as the shielding target area of the route information. The nodes within the shielding target area are the nodes 20A, 20B, 20C, 20D, 20E, 20F, 20J, 20K and 20M. The shielding target area of the route information includes some proportions of the domains 1, 4 and the whole domain 2. Each of the nodes within the shielding target area retains the link attribute information (the link management information database) for specifying the shielding target area.

At this time, the link connecting the node 20C and the node 20N to each other is the intra-domain link of the domain 1 and is also the link connected to the outside of the shielding target area of the route information.

Each node in the modified example of the first embodiment has the same configuration as the configuration of the node illustrated in FIG. 2.

FIG. 11 is a diagram illustrating an example of the link management information database retained by the node 10C. Each node has the link management information database 1052. The link management information database 1052 includes information on the domain (self-domain) to which the self-node belongs, information about the destination domain on the per-interface basis, and information indicating whether the destination node is within the shielding target area or outside the shielding target area. In this case, inhibition of an information disclosure to the outside of the shielding target area is set as a route information shielding policy. In the link management information database 1052, the information on the domain (self-domain) to which the self-node belongs is not necessarily required.

Each node within the shielding target area of the route information recognizes, based on the link management information database, whether the self-node is located at the shielding border, and can execute a proper process.

Each node within the shielding target area in this modified example executes the same processes as those in the processing flow depicted in FIG. 4. The determination about whether the self-node is located at the shielding border or not is made from knowing whether the destination node in the link management information database 1052 is within the shielding target area or outside the shielding target area. If the destination node is outside the shielding target area, it is determined that the node is located at the shielding border.

Second Embodiment

Next, a second embodiment will hereinafter be described. The second embodiment has the common points to the first embodiment. Accordingly, the discussion will be focused on different points, while the explanations of the common points are omitted.

The second embodiment will discuss a method of shielding the route information of only some of the nodes within the shielding target area of the route information.

<Configuration>

The network architecture in the second embodiment is the same as the network architecture in FIG. 1 in the first embodiment. The configuration of each node within the shielding target area of the route information in the second embodiment is the same as the configuration of the node in FIG. 2 in the first embodiment.

Further, the same network architecture as in FIG. 10 according to the modified example of the first embodiment can be taken by way of another modified example.

Operational Example

A processing flow of each node within the shielding target area of the route information is the same as the processing flow in FIG. 4 in the first embodiment. In the first embodiment, each node within the shielding target area uniformly attaches the shielding target flag representing that the RRO sub-object is the shielding target. In the second embodiment, a shielding policy can be set on a per-node basis. If a shielding non-target policy is set in a certain node, on the occasion of adding the RRO sub-object, the shielding target flag is not attached. With this scheme, as for the node in which the shielding non-target policy is set, the RRO sub-object is not deleted in the shielding border node.

Figure 12:
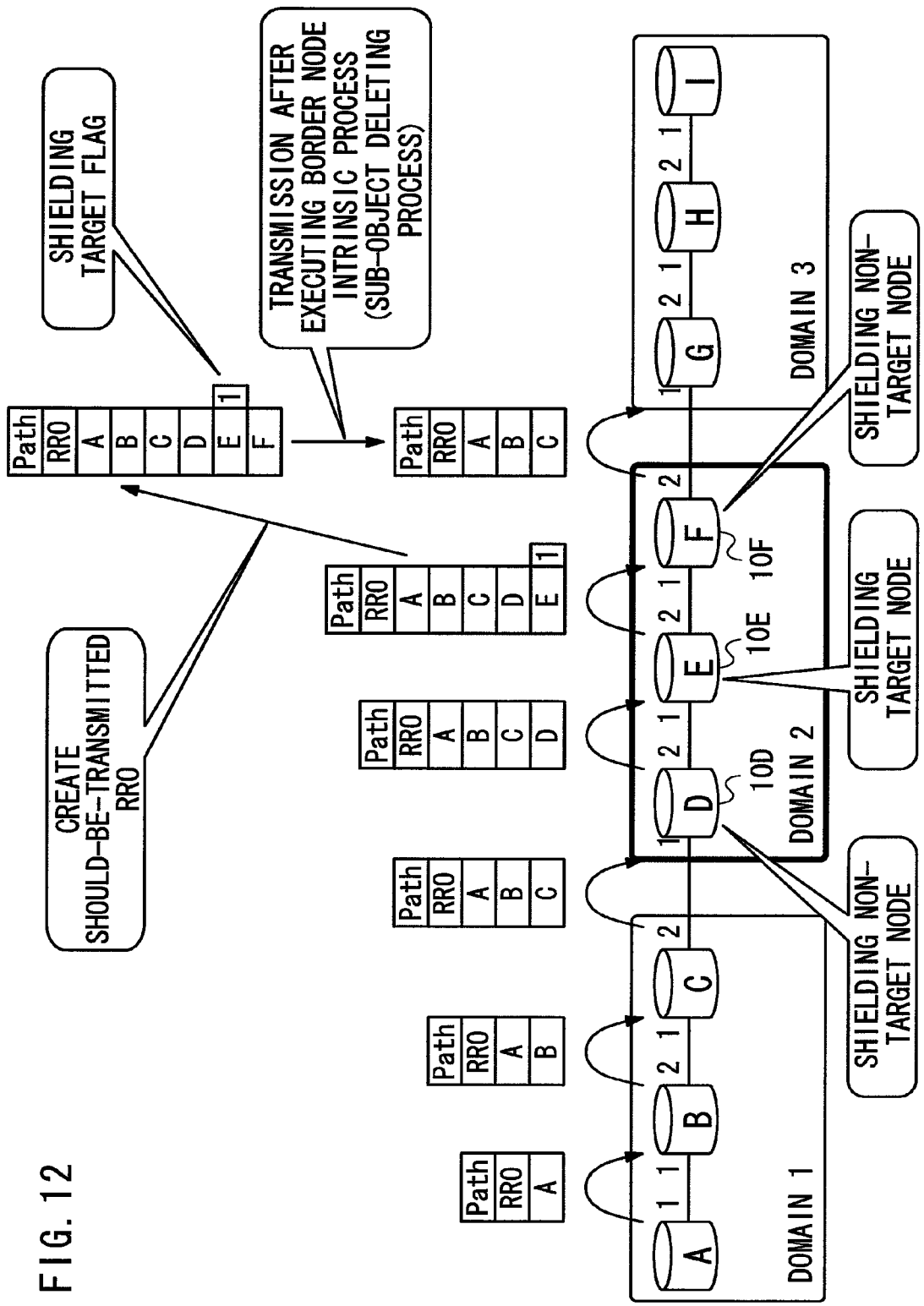
FIG. 12 is a diagram illustrating how the route information is partially shielded.

FIG. 12 is a diagram illustrating an example of a RRO sub-object deleting process by the shielding border node in the second embodiment. In FIG. 12, the domain 2 is designated as the shielding target area of the route information. Further, the node 10D and the node 10F are shielding non-target nodes, and the node 10E is the shielding target node. The node 10F, when deciding that the self-node is the shielding target node, deletes the RRO sub-object (E) attached with the flag which represents being the shielding target node and this flag as well.

Operation and Effect in Second Embodiment

According to the embodiment discussed above, within the shielding target area of the route information, each node can acquire the normal route information similarly to the case of the first embodiment. Moreover, the scheme of setting the nodes into the shielding target nodes and the shielding non-target nodes enables each node outside the shielding target area of the route information to acquire the route information for the nodes excluding the shielding target nodes within the shielding target area.

Third Embodiment

Next, a third embodiment will hereinafter be described. The third embodiment has the common points to the first embodiment. Accordingly, the discussion will be focused on different points, while the explanations of the common points are omitted.

In the first embodiment, if the node within the shielding target area of the route information becomes an ingress node, all items of route information are deleted in the shielding border node within the shielding target area, and hence it follows that the RRO containing none of the data is transmitted. It is a violation of the standard to transmit the RRO containing none of the data, which is a problem. The third embodiment solves this problem.

<Configuration>

Figure 13:
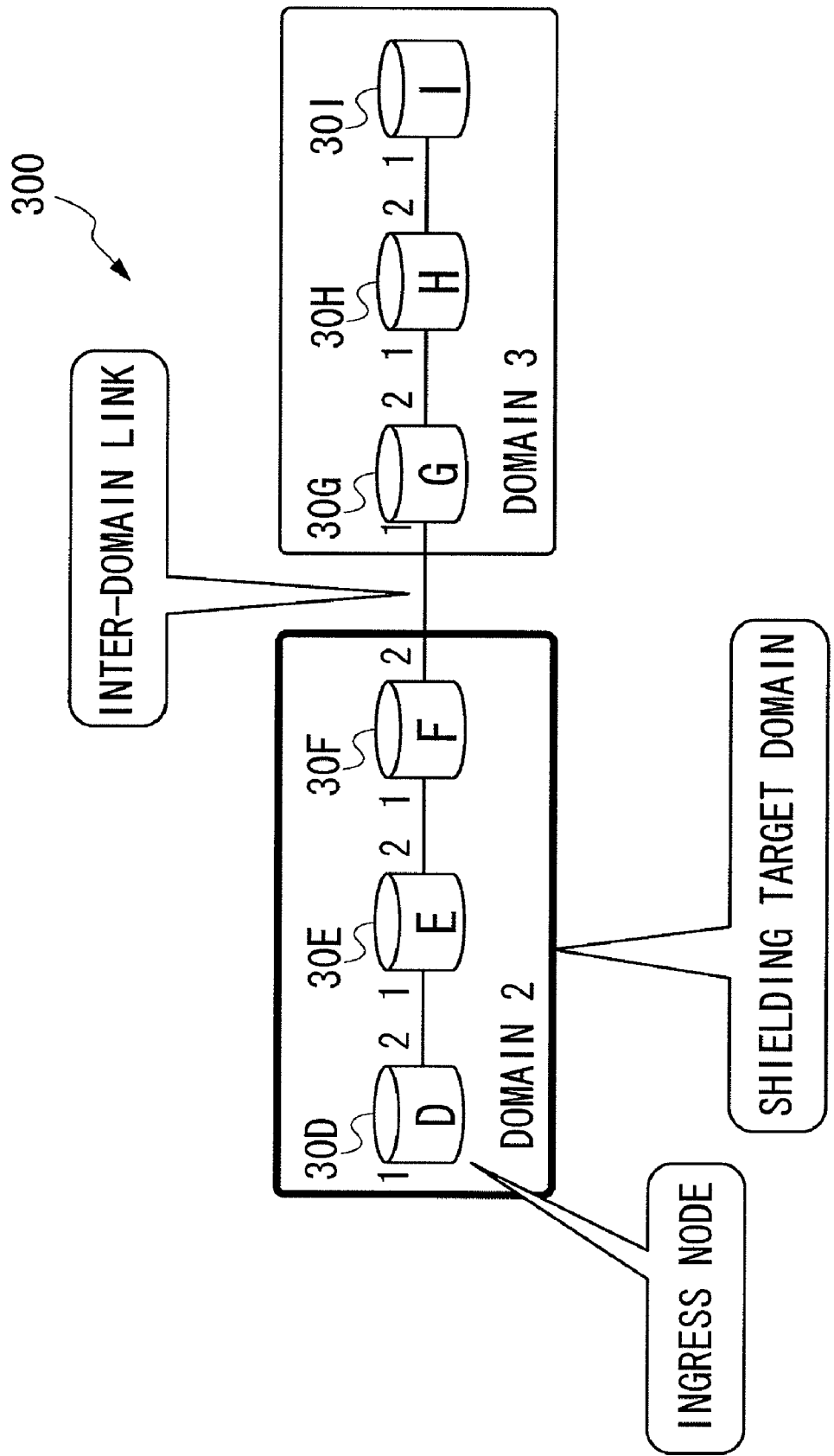
FIG. 13 is a diagram illustrating an example of a network architecture in a third embodiment.
Figure 15:
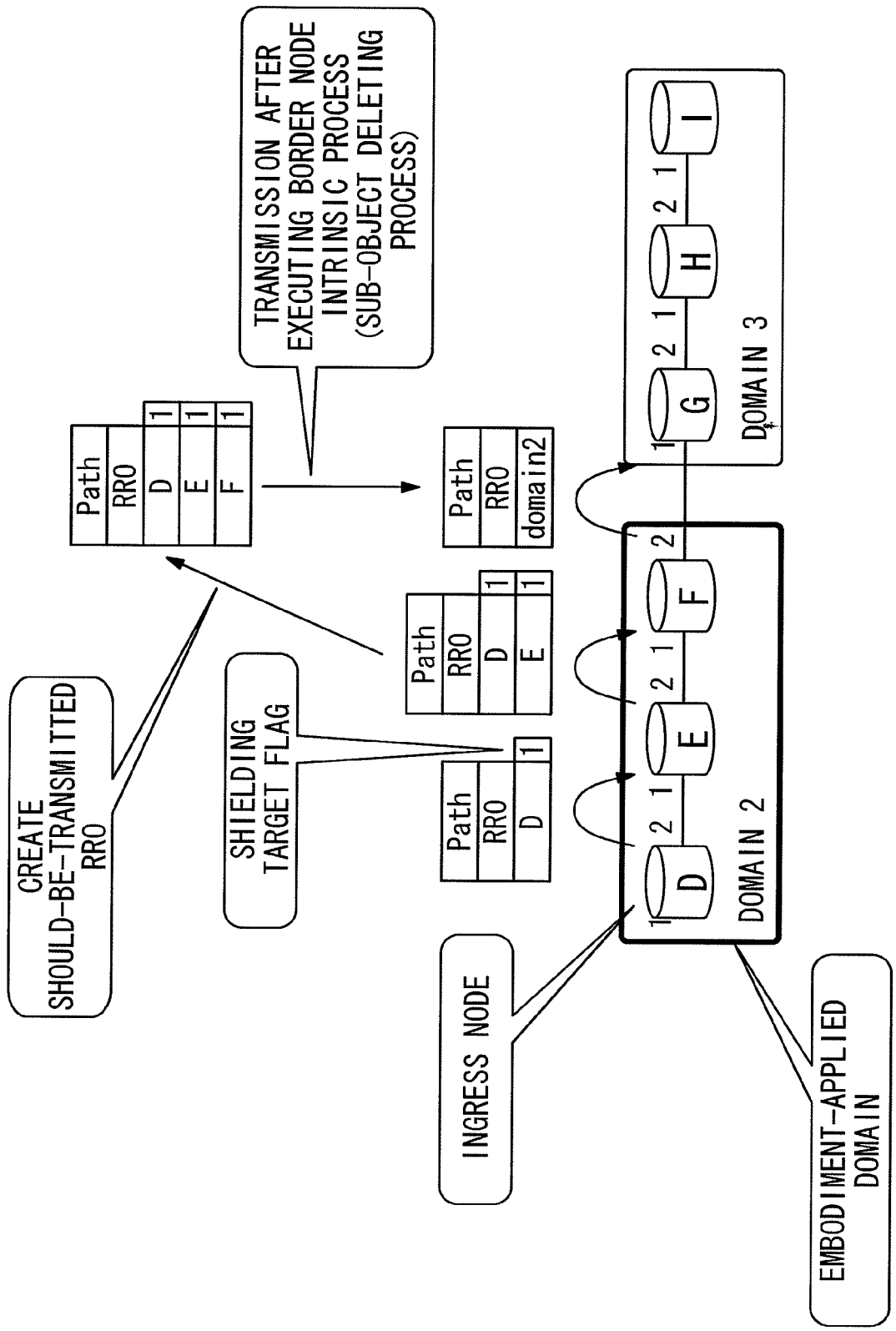
FIG. 15 is a diagram illustrating a pseudo node adding process.

FIG. 13 is a diagram illustrating an example of the network architecture in the third embodiment. FIG. 15 depicts an example in which the shielding target area of the route information is set on the domain basis.

Six pieces of nodes (node 30D through 30I) exist in a network 300 in FIG. 13. The domain embraces the nodes 30D, 30E and 30F, and the domain 3 embraces the nodes 30G, 30H and 30I. The node 30D is an ingress node. Herein, the domain 2 is set as the shielding target area of the route information. In this case, the node located at the border of the shielding target area recognizes that the self-node is the shielding border node by use of the domain attribute information (the link management information database) of the link. Herein, the link within the domain is defined as the intra-domain link, and the link establishing the connection between the domains is defined the inter-domain link. Each node manages the link (link attribute) connecting directly with the self-node.

The configuration of the shielding target node of the route information in the third embodiment is the same as the node configuration in FIG. 2 in the first embodiment.

Operational Example

Figure 14:
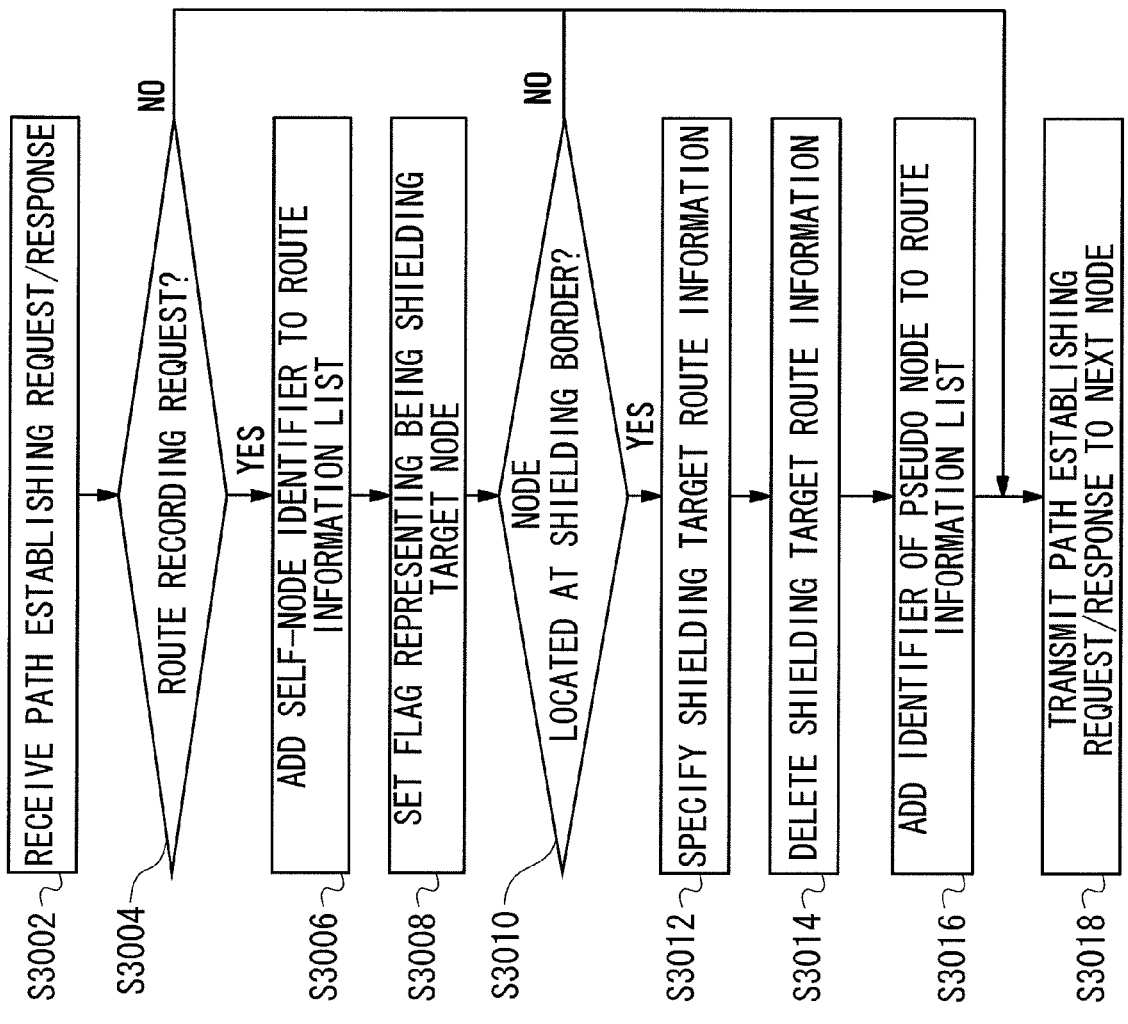
FIG. 14 is a flowchart illustrating a processing flow in the third embodiment.

FIG. 14 is a flowchart illustrating a processing flow of the node within the shielding target area in the third embodiment. Herein, the discussion will be focused on an example of the node 10F. The processes are also executed according to the same processing flow in the nodes 10D and the node 10E.

In FIG. 14, the processing flow till the shielding target route information is deleted (S3014) since the path establishing request has been received (S3002) is the same as the processing flow (FIG. 4) in the first embodiment. If the ingress node exists within the shielding target area of the route information, however, the route information disappears when deleting the shielding target route information. Such being the case, the node 10F defined as the shielding border node adds, as the RRO sub-object, a pseudo node (domain 2) acting as a representative of the shielding target domain (S3016).

FIG. 15 is the diagram illustrating an example of an RRO sub-object deleting process by the border node. The node 10F, when determining that the self-node is the shielding border node, deletes the RRO sub-object (D, E, F) attached with the flag which represents being the shielding target node and this flag as well. Moreover, the node 10F adds, to the RRO sub-object, a pseudo node (domain 2) acting as the representative of the shielding target domain. This scheme makes it possible to avoid the RRO containing none of the data from being sent.

The node 10F, after the predetermined process, transmits the path establishing request to the next node (S3018).

Operation and Effect in Third Embodiment

According to the third embodiment, as depicted in FIG. 15, if the ingress node exists within the shielding target domain and if the deleting target setting is done in all of the nodes within the domain, it follows that the RRO containing none of the data is sent unless the present function is implemented. It is the violation of the standard to send the RRO containing none of the data, however, this violation can be avoided by making use of this function.

Moreover, the scheme of adding the pseudo node in the third embodiment to the RRO sub-object can be applied to a case in which the ingress node does not exist within the shielding target area of the route information.

Fourth Embodiment

Next, a fourth embodiment will hereinafter be described. The fourth embodiment has the common points to the first embodiment. Accordingly, the discussion will be focused on different points, while the explanations of the common points are omitted.

The fourth embodiment will discusses a method of realizing the soft shielding of the route information without adding any change to the RRO sub-object.

<Configuration>

The network architecture in the fourth embodiment is the same as the example of the network architecture in FIG. 1 in the first embodiment.

Moreover, a modified example can take the same network architecture in FIG. 10 in the modified example of the first embodiment.

Figure 16:
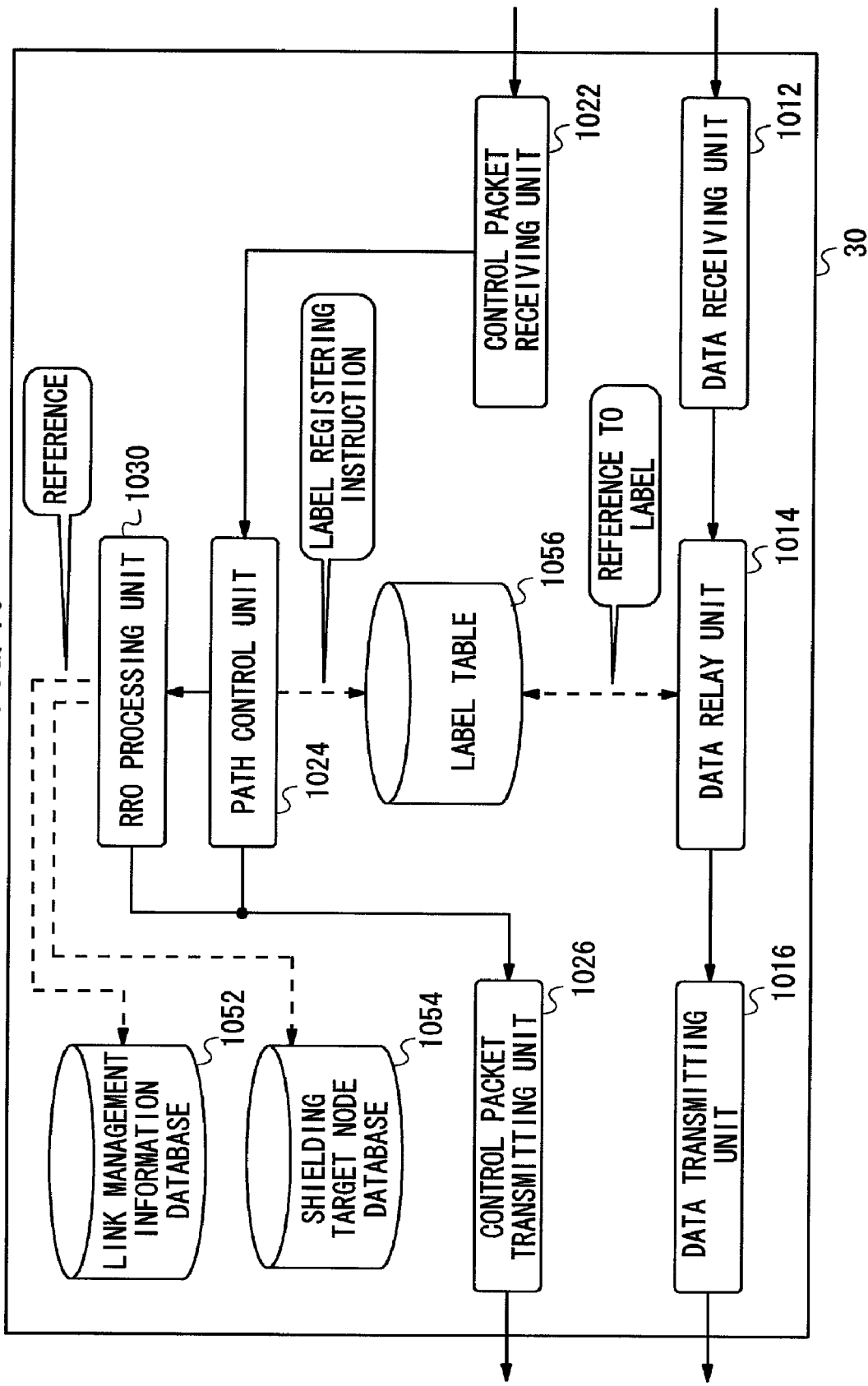
FIG. 16 is a diagram illustrating an example of a configuration of the node in a fourth embodiment.

FIG. 16 is a diagram illustrating a configuration of the node within the shielding target area of the route information in the fourth embodiment. The node within the shielding target area of the route information in the fourth embodiment has substantially the same configuration of the node in FIG. 2 in the first embodiment. The node in the fourth embodiment further includes a shielding target node database 1054. It is sufficient that the shielding target node database 1054 is retained by all of the nodes located leastwise at the shielding border. Namely, the nodes, which certainly do not become the shielding border nodes, may not retain the shielding target node database 1054.

The shielding target node database 1054 is a database that describes a list of the shielding target nodes.

The RRO processing unit 1030 does not, unlike the first embodiment, attach the shielding target flag which represents being the shielding target.

Moreover, the RRO processing unit 1030, when determining that the self-node is the shielding border node, compares the RRO sub-object list with the shielding target node database. The RRO processing unit 1030, as a result of the comparison, deletes the node coincident with the node described in the shielding target node database from the RRO sub-object list.

Operational Example

Figure 17:
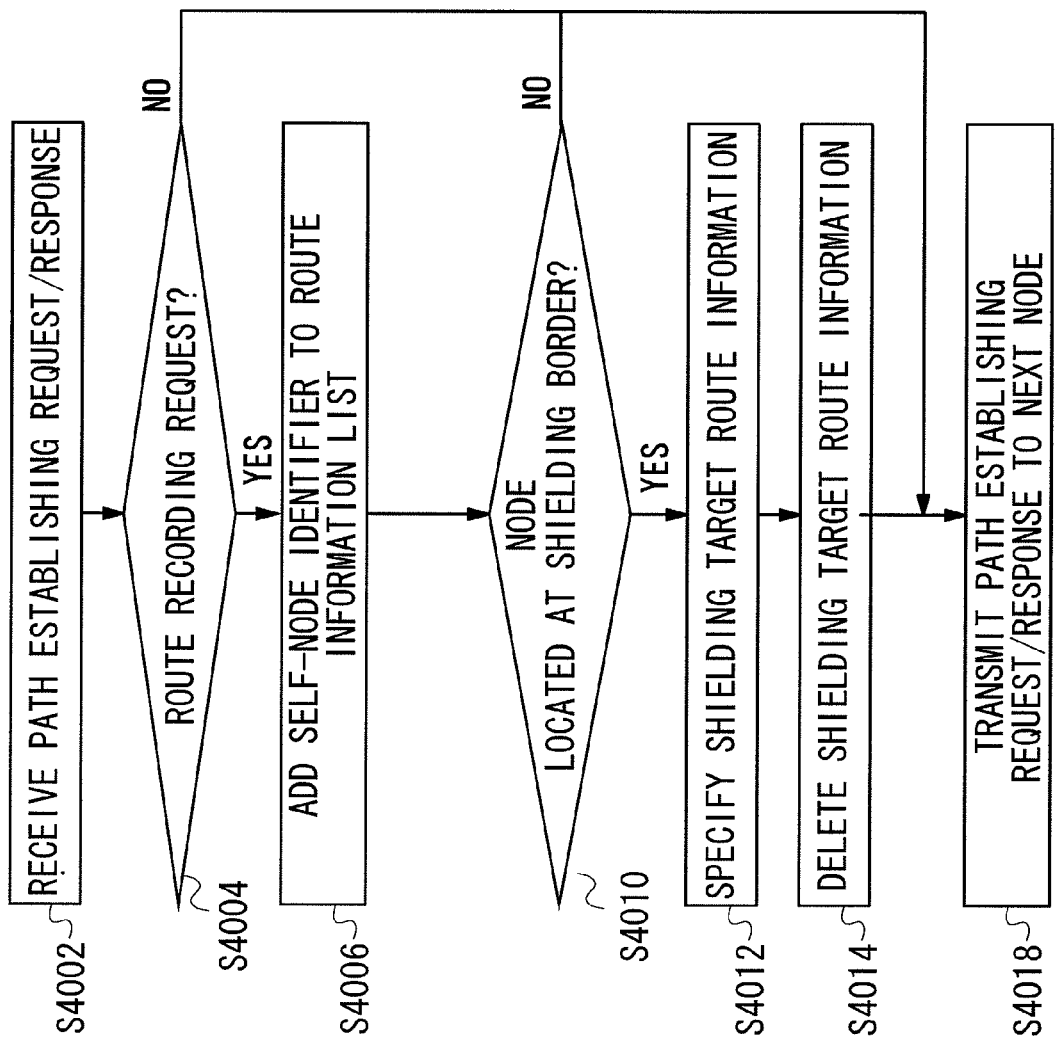
FIG. 17 is a flowchart illustrating a processing flow in the fourth embodiment.

FIG. 17 is a flowchart illustrating an example of a processing flow of the node within the shielding target area in the fourth embodiment. Herein, the discussion will be focused on an example of the node 10F. The processes are also executed according to the same processing flow in the nodes 10D and the node 10E.

In FIG. 17, the processing flow till the path establishing request is given to the next node (S4018) since the path establishing request has been received (S4002) is the same as the processing flow (FIG. 4) in the first embodiment. The fourth embodiment does not, however, entail setting the flag which represents being the shielding target node. Further, the fourth embodiment involves using the shielding target node database 1054 in place of employing the flag which represents being the shielding target node on the occasion of specifying the shielding target route information (S4012).

Figure 18:
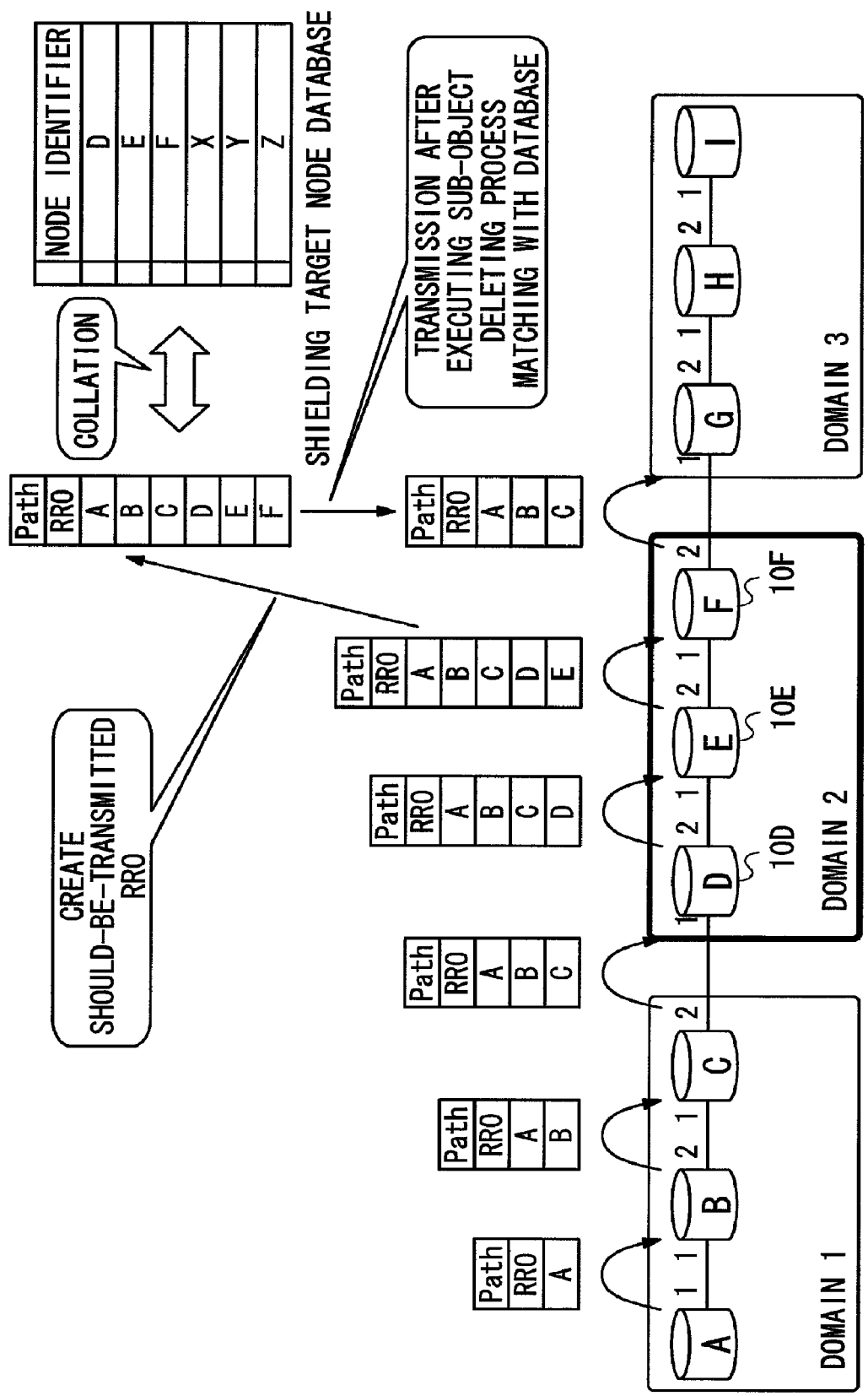
FIG. 18 is a diagram illustrating an example of specifying the shielding target node based on data matching.

FIG. 18 is a diagram illustrating an example of a sub-object deleting process by the border node. The node 10F within the shielding target area, when determining that the self-node is the shielding border node, refers to the shielding target node database 1054 and thus deletes the RRO sub-object (D, E, F).

Operation and Effect in Fourth Embodiment

According to the fourth embodiment, the shielding target node database 1054 is updated on demand without adding any change to the RRO sub-object, whereby the shielding of the route information can be realized while flexibly changing the shielding range of the route information.

Modified Example

An intra-domain topology database can be utilized in place of preparing the shielding target node database 1054.

In the GMPLS/MPLS, a routing protocol (Non-Patent document 5, Non-Patent document 6, Non-Patent document 7, Non-Patent document 8, etc) for collecting pieces of topology information of the nodes within the network is defined as the standard. Each node can acquire the information about the nodes located within the network by use of this protocol. Information about the area can be added to the topology database, and hence, if an area value different on the per-domain basis is set, a process of setting only one domain as the shielding target can be actualized.

Fifth Embodiment

Next, a fifth embodiment will hereinafter be described. The fifth embodiment has the common points to the fourth embodiment. Accordingly, the discussion will be focused on different points, while the explanations of the common points are omitted.

The fifth embodiment will discuss a method of providing a scheme for adding the pseudo node in the third embodiment to the configuration in the fourth embodiment.

<Configuration>

The network and the respective nodes in the fifth embodiment have the same network architecture and the same node configuration as those in the fourth embodiment.

Operational Example

Figure 19:
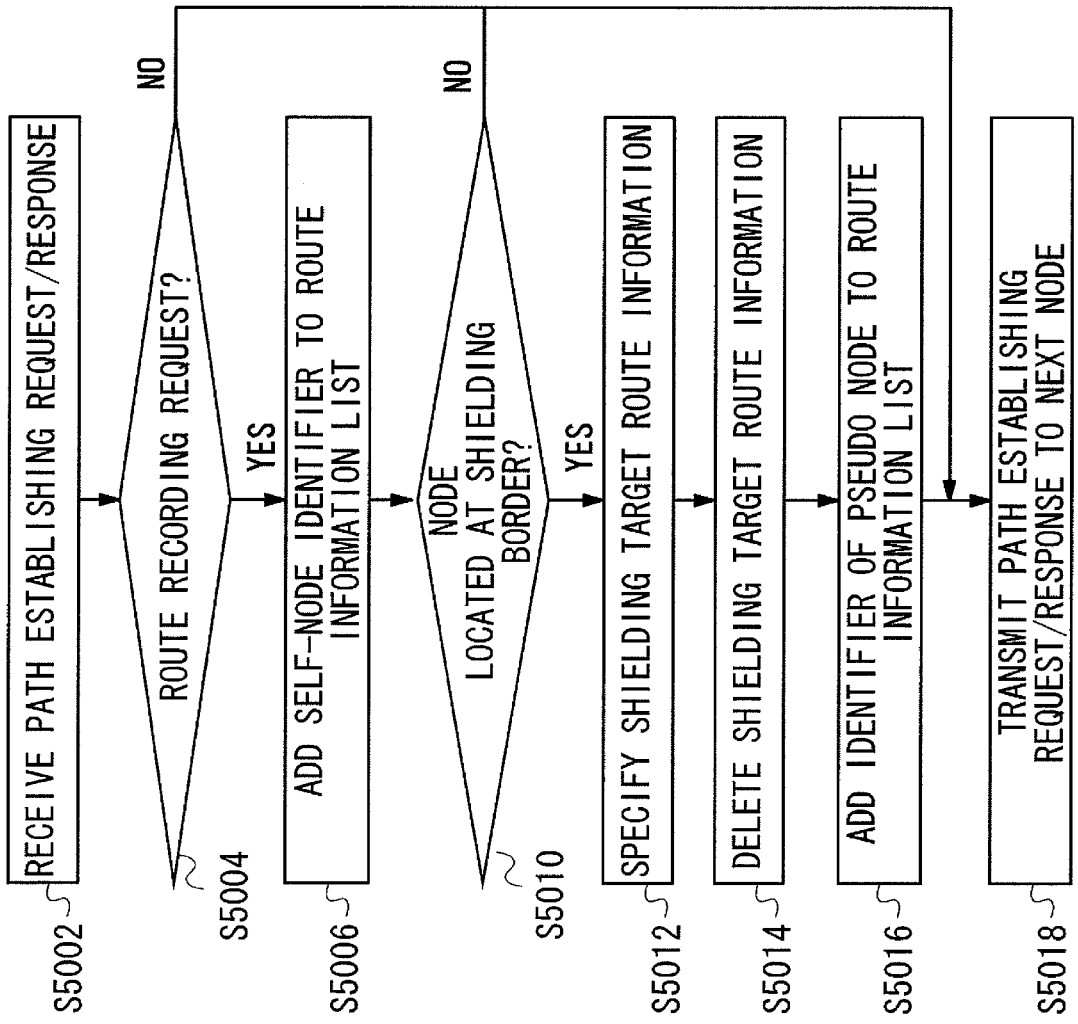
FIG. 19 is a flowchart illustrating a processing flow in a fifth embodiment.

FIG. 19 is a flowchart illustrating an example of the processing flow of the node within the shielding target area in the fifth embodiment. Herein, the discussion will be focused on an example of the node 10F. The processes are also executed according to the same processing flow in the nodes 10D and the node 10E.

In FIG. 19, the processing flow till the shielding target route information is deleted (S5014) since the path establishing request has been received (S5002) is the same as the processing flow (FIG. 17) in the fourth embodiment. In the fifth embodiment, after deleting the shielding target route information, similarly to the third embodiment, the pseudo node (domain 2) acting as the representative of the shielding target domain is added to the RRO sub-object list.

Figure 20:
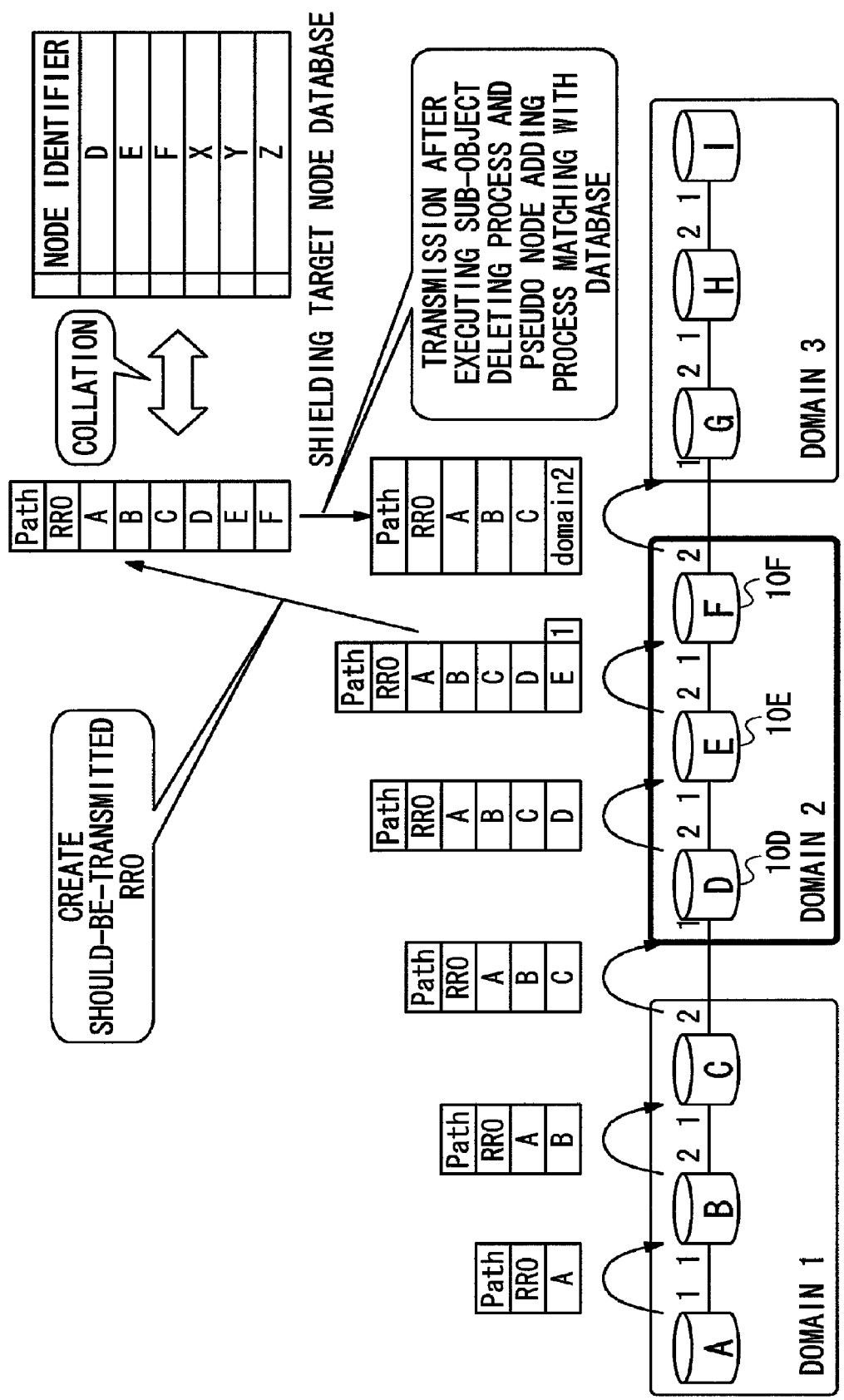
FIG. 20 is a diagram illustrating an example of specifying the shielding target node based on the data matching.
Figure 21:
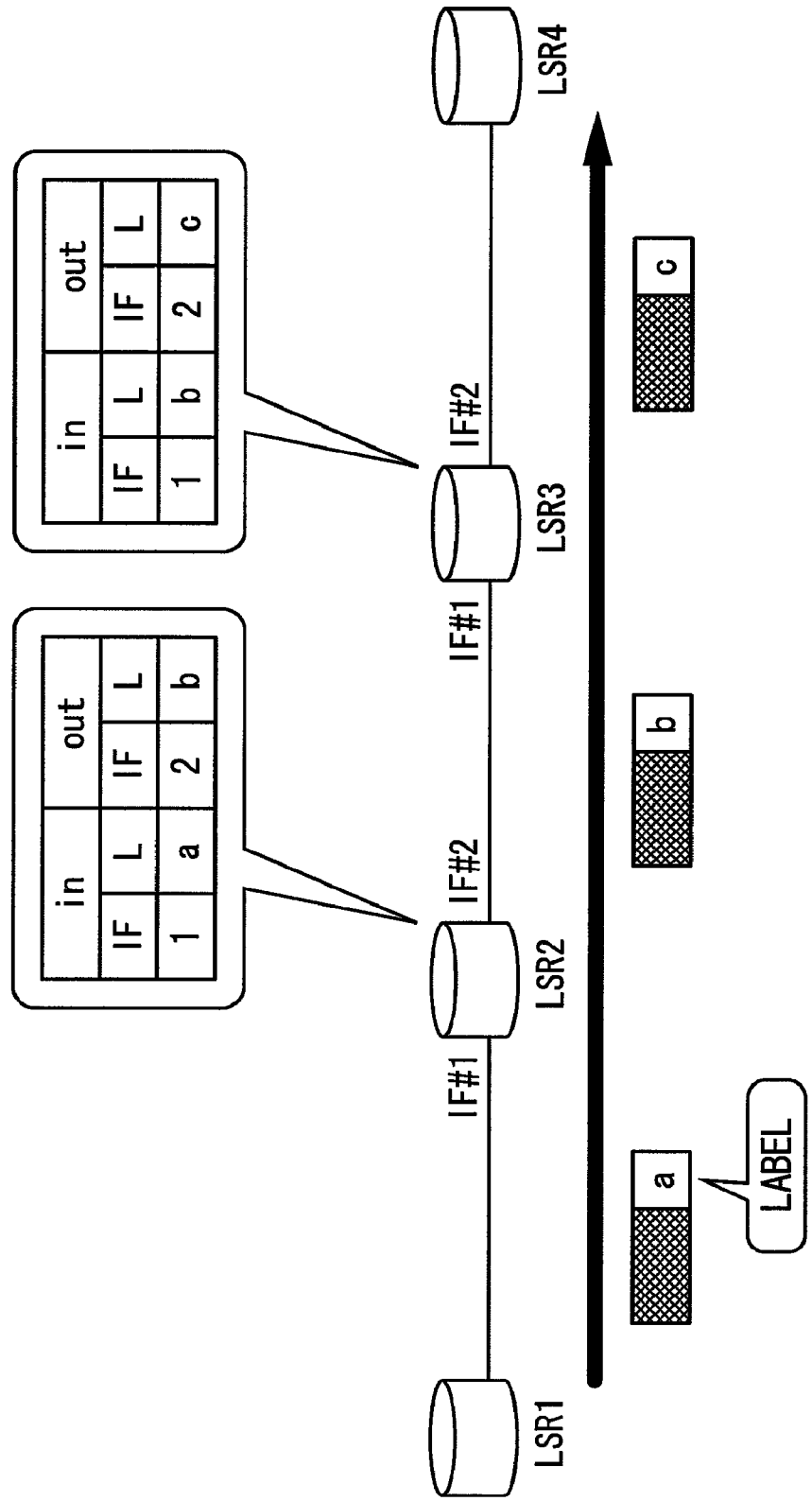
FIG. 21 is a diagram illustrating how a packet is forwarded in a way that uses a fixed length label.
Figure 22:
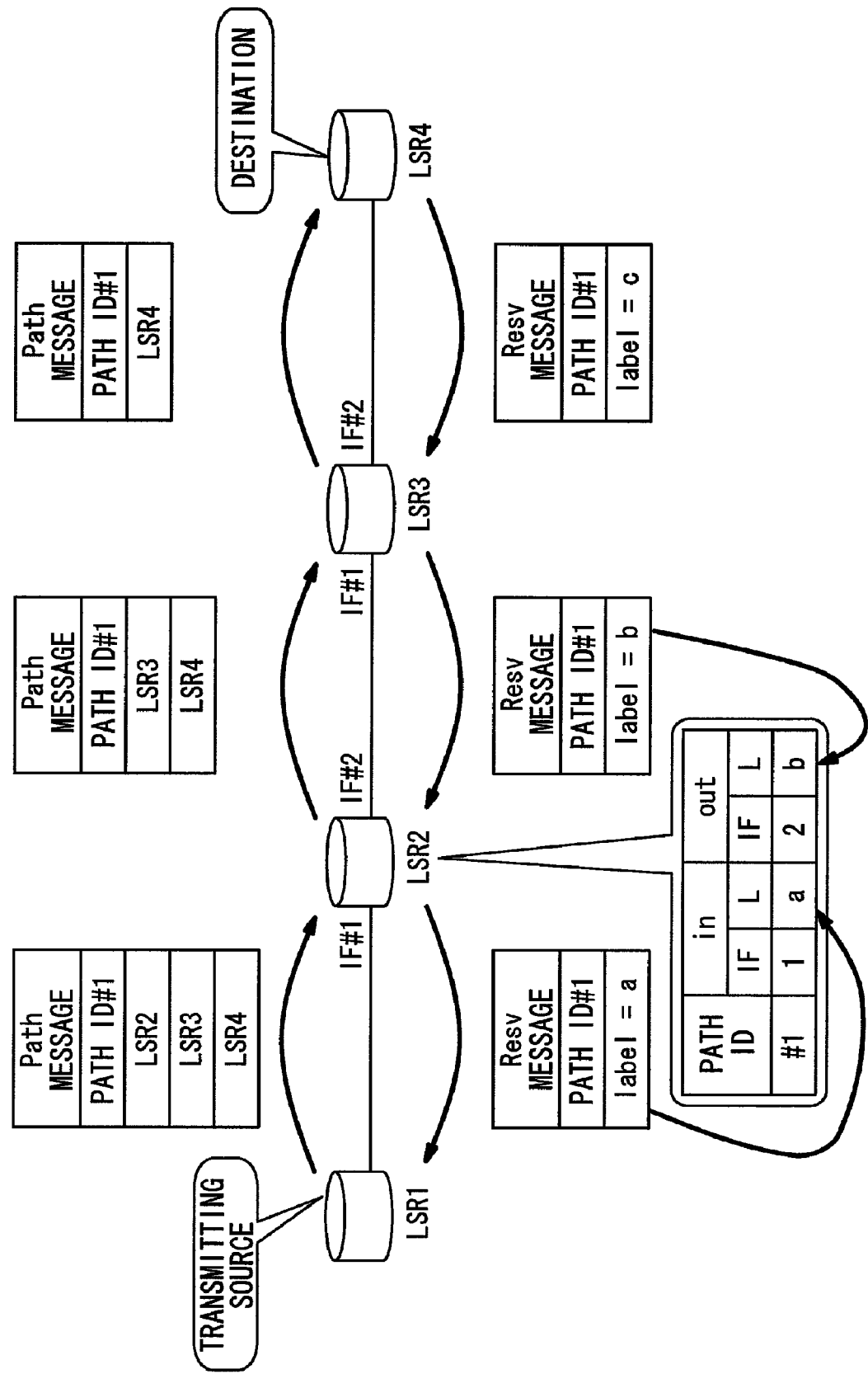
FIG. 22 is a diagram illustrating an operation of a path establishing signaling protocol (RSVP-TE).
Figure 23:
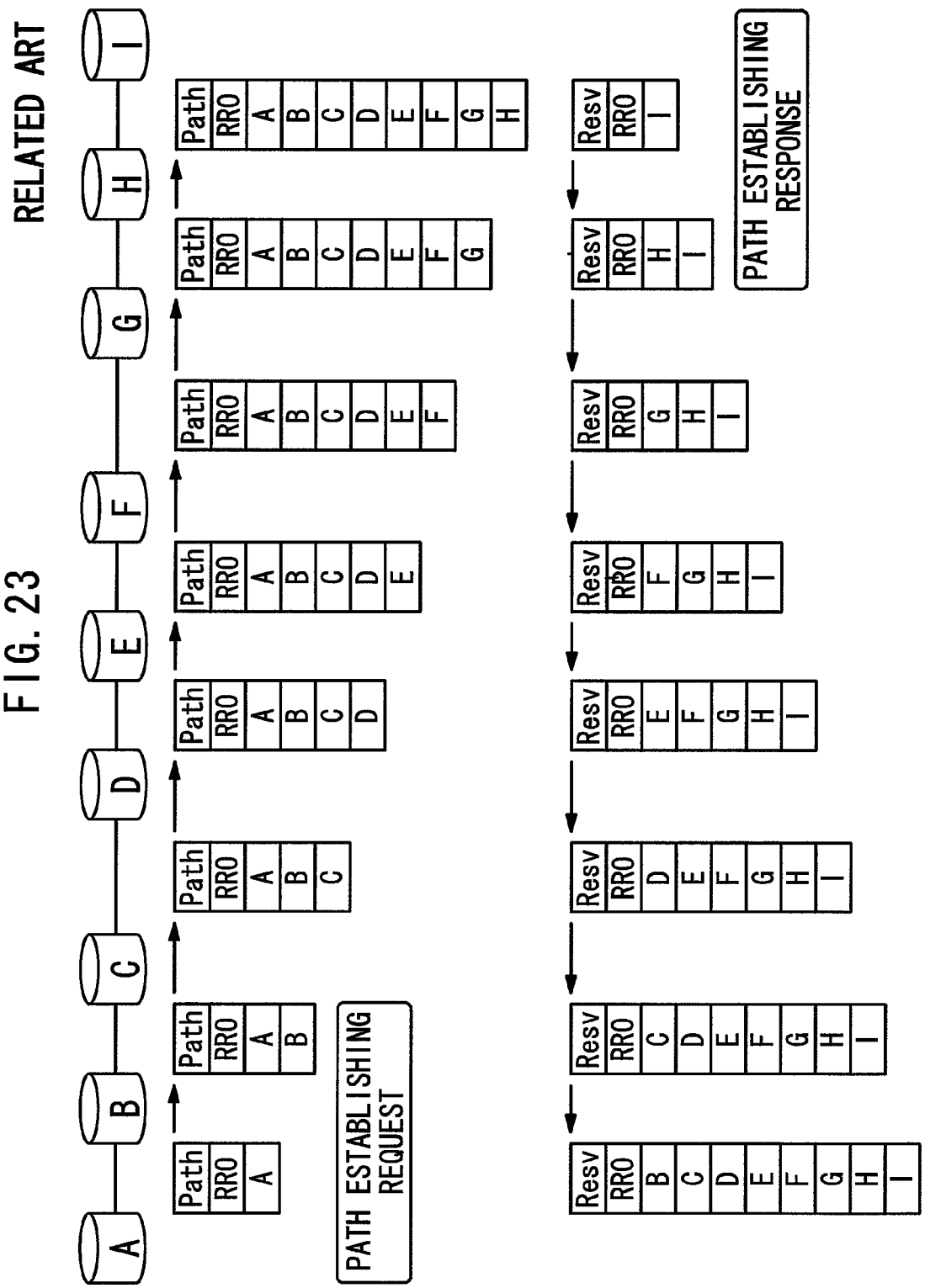
FIG. 23 is a diagram illustrating an operation of a route tracing function using RRO.
Figure 24:
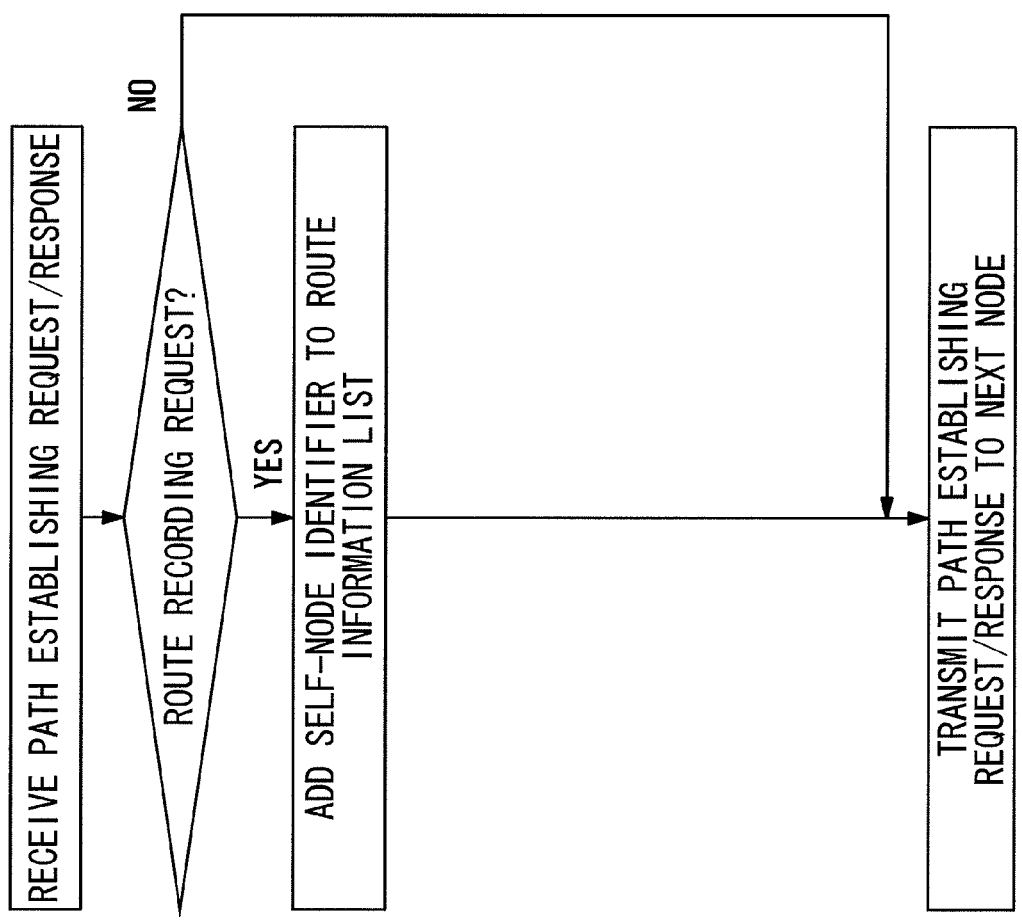
FIG. 24 is a flowchart illustrating a standard specification processing flow.
Figure 25:
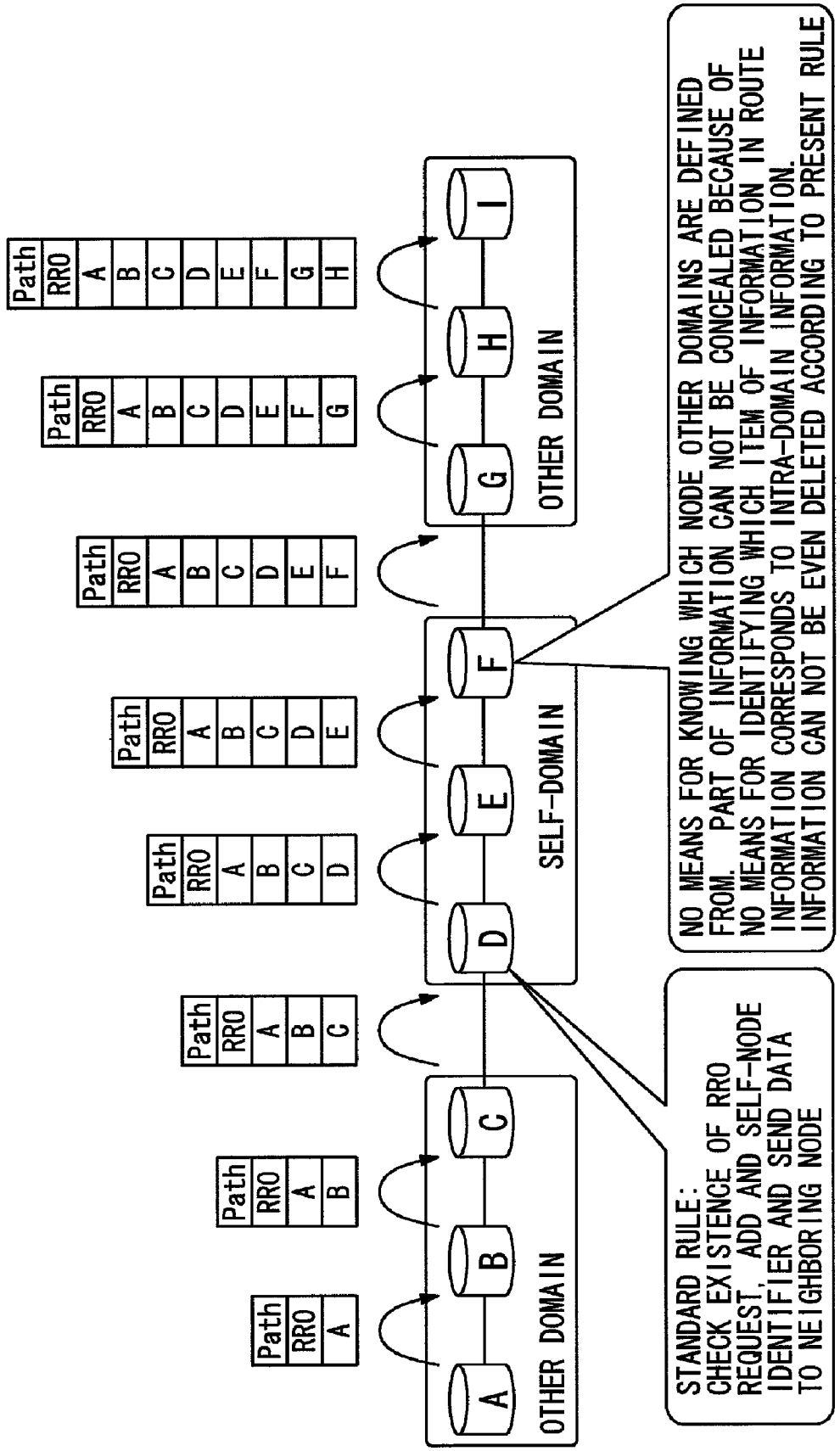
FIG. 25 is a diagram illustrating a problem of an existing route trace.
Figure 26:
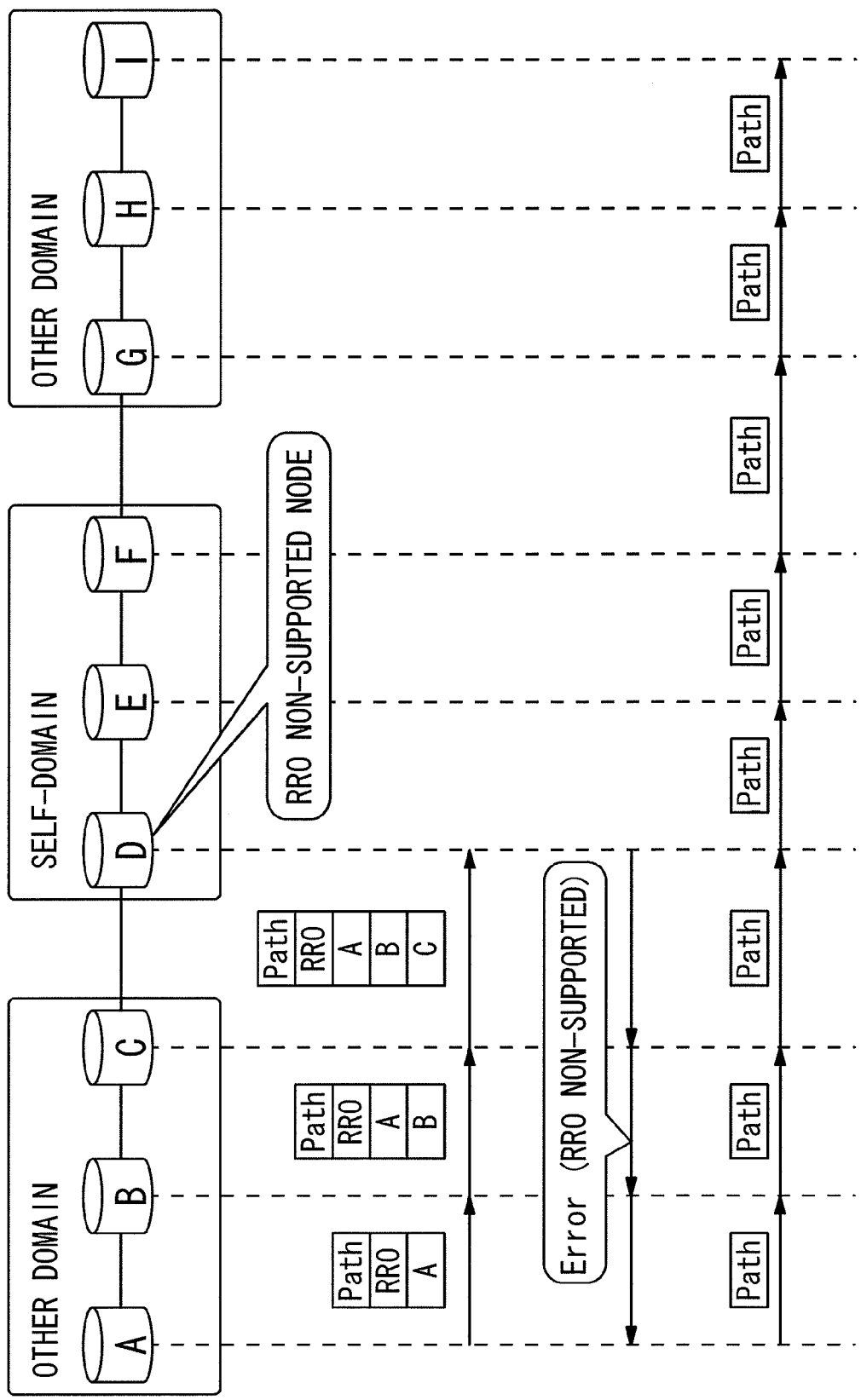
FIG. 26 is a diagram illustrating an operation when a RRO function is ineffective.

FIG. 20 is a diagram illustrating an example of the sub-object deleting process by the border node. The node 10F within the shielding target area, when determining that the self-node is the shielding border node, refers to the shielding target node database 1054 and thus deletes the RRO sub-object (D, E, F). Further, the node 10F adds the pseudo node (domain 2) to the RRO sub-object.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A relay node comprising:
a receiving unit receiving a control message for a route trace, which contains route information about a path extending from an ingress node to an egress node and used for forwarding data, from an anterior node on the path;
an editing unit, if a self-node is a border node located at a border of a route information shielding zone on the path, editing, in an undistinguishable status, information about the route information shielding zone of route information contained in the route trace control message received by said receiving unit; and
a transmitting unit transmitting the route trace control message after being edited to a posterior node on the path,
wherein said editing unit deletes the information about the route information shielding zone from the route information,
the route information includes a list containing an identifier of a node through which the path extends and a flag indicating whether said node belongs to the route information shielding zone or not, and
said editing unit specifies, based on the flag, said node belonging to the route information shielding zone in the list, and deletes the identifier of said specified node from the list.

2. A relay node according to claim 1, further comprising a storage unit stored with specifying information of said node belonging to the route information shielding zone,
wherein said editing unit deletes, based on the specifying information in said storage unit, the information about the route information shielding zone from the route information.

3. A relay node according to claim 1, further comprising a link management information database stored with a domain to which said self-node belongs and a domain to which another relay node connecting with a self-device belongs,
wherein said editing unit refers to said link management information database and thus determines whether or not the domain to which said self-device belongs is coincident with the domain to which a second relay node defined as a transmitting destination of the control message belongs, and determines that said self-node is said border node if the domain to which said self-device belongs is not coincident with the domain to which said posterior relay node device defined as the transmitting destination of the control message belongs.

4. A relay node according to claim 1, further comprising a link management information database stored with a domain to which said self-node belongs and information indicating whether another relay node connecting with said self-node is within the shielding target area of the route information or outside the shielding target area thereof,
wherein said editing unit refers to said link management information database and thus determines whether or not said posterior relay node device defined as the transmitting destination of the control message is outside the shielding target area of the route information, and determines that said self-node is said border node if said posterior relay node device defined as the transmitting destination of the control message is outside the shielding target area of the route information.

5. A relay node according to claim 1, wherein said editing unit, if said self-node is not said border node but belongs to the route information shielding zone, attaches the identifier of said self-node and a flag indicating that said self-node belongs to the route information shielding zone to the route trace control message received by said receiving unit.

6. A relay node comprising:
a receiving unit receiving a control message for a route trace, which contains route information about a path extending from an ingress node to an egress node and used for forwarding data, from an anterior node on the path;
an editing unit, if a self-node is a border node located at a border of a route information shielding zone on the path, editing, in an undistinguishable status, information about the route information shielding zone of route information contained in the route trace control message received by said receiving unit; and
a transmitting unit transmitting the route trace control message after being edited to a posterior node on the path,
wherein said editing unit deletes the information about the route information shielding zone from the route information,
said editing unit adds, to the route information, pseudo information about the route information shielding zone as a substitute for the deleted information about the route information shielding zone,
the route information includes a list containing an identifier of a node through which the path extends and a flag indicating whether said node belongs to the route information shielding zone or not, and
said editing unit specifies, based on the flag, said node belonging to the route information shielding zone in the list, and deletes the identifier of said specified node from the list.

* * * * *